United States Patent
Jang et al.

(10) Patent No.: US 11,006,109 B2
(45) Date of Patent: May 11, 2021

(54) INTRA PREDICTION MODE BASED IMAGE PROCESSING METHOD, AND APPARATUS THEREFOR

(71) Applicant: LG ELECTRONICS INC., Seoul (KR)

(72) Inventors: Hyeongmoon Jang, Seoul (KR); Seunghwan Kim, Seoul (KR); Jaehyun Lim, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 0 days.

(21) Appl. No.: 16/624,734

(22) PCT Filed: Jun. 19, 2018

(86) PCT No.: PCT/KR2018/006927
§ 371 (c)(1),
(2) Date: Dec. 19, 2019

(87) PCT Pub. No.: WO2018/236133
PCT Pub. Date: Dec. 27, 2018

(65) Prior Publication Data
US 2020/0221084 A1     Jul. 9, 2020

Related U.S. Application Data

(60) Provisional application No. 62/521,556, filed on Jun. 19, 2017.

(51) Int. Cl.
*H04N 19/117*     (2014.01)
*H04N 19/159*     (2014.01)
(Continued)

(52) U.S. Cl.
CPC ......... *H04N 19/117* (2014.11); *H04N 19/159* (2014.11); *H04N 19/176* (2014.11); *H04N 19/593* (2014.11); *H04N 19/70* (2014.11)

(58) Field of Classification Search
CPC ............................. H04N 19/11; H04N 19/117
See application file for complete search history.

(56) References Cited

U.S. PATENT DOCUMENTS

2009/0129468 A1*   5/2009   Park ..................... H04N 19/159
                                                                         375/240.13
2018/0262756 A1*   9/2018   Filippov .............. H04N 19/184
(Continued)

FOREIGN PATENT DOCUMENTS

KR    10-2015-0052259 A      5/2015
KR    10-2015-0140848 A     12/2015
(Continued)

*Primary Examiner* — Jerry T Jean Baptiste
(74) *Attorney, Agent, or Firm* — Dentons US LLP

(57) ABSTRACT

The present invention provides an image processing method on the basis of an intra prediction mode and an apparatus therefor. Specifically, a method for processing an image on the basis of an intra prediction mode may comprise the steps of: identifying whether weighted intra prediction is allowed for a current block and whether the weight intra prediction is applied to the current block; identifying whether reference sample filtering is applied to the current block when the weighted intra prediction is not allowed for the current block or when the weighted intra prediction is not applied to the current block; and performing reference sample filtering of reference samples neighboring the current block when the reference sample filtering is applied.

8 Claims, 36 Drawing Sheets

(51) Int. Cl.
*H04N 19/176* (2014.01)
*H04N 19/593* (2014.01)
*H04N 19/70* (2014.01)

(56) References Cited

U.S. PATENT DOCUMENTS

2019/0104303 A1* 4/2019 Xiu ...................... H04N 19/182
2019/0222837 A1* 7/2019 Lee ........................ H04N 19/44

FOREIGN PATENT DOCUMENTS

| KR | 10-2016-0056321 A | 5/2016 |
| KR | 10-1624659 B1 | 5/2016 |
| KR | 10-1663397 B1 | 10/2016 |

\* cited by examiner

[FIG. 1]
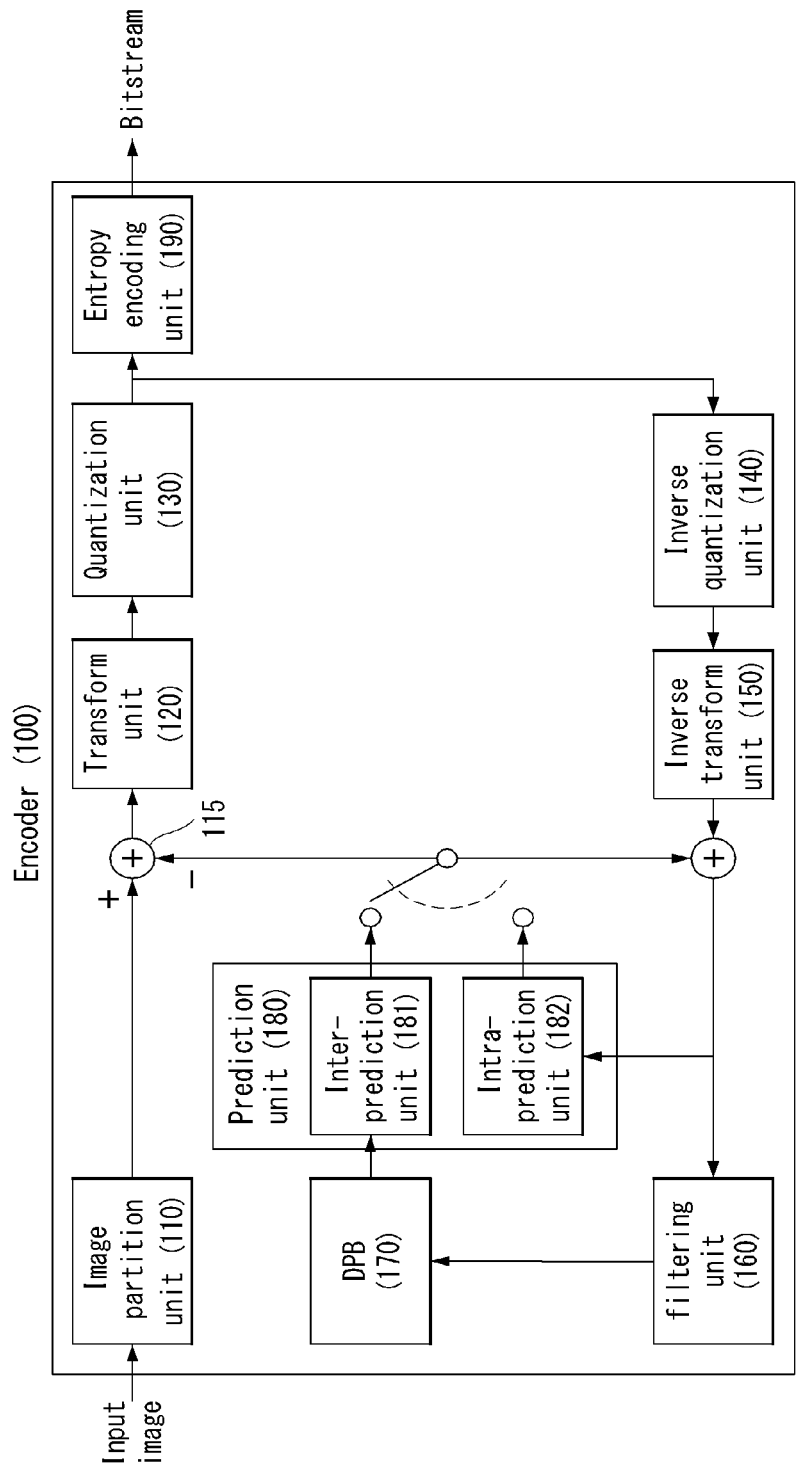

[FIG. 2]
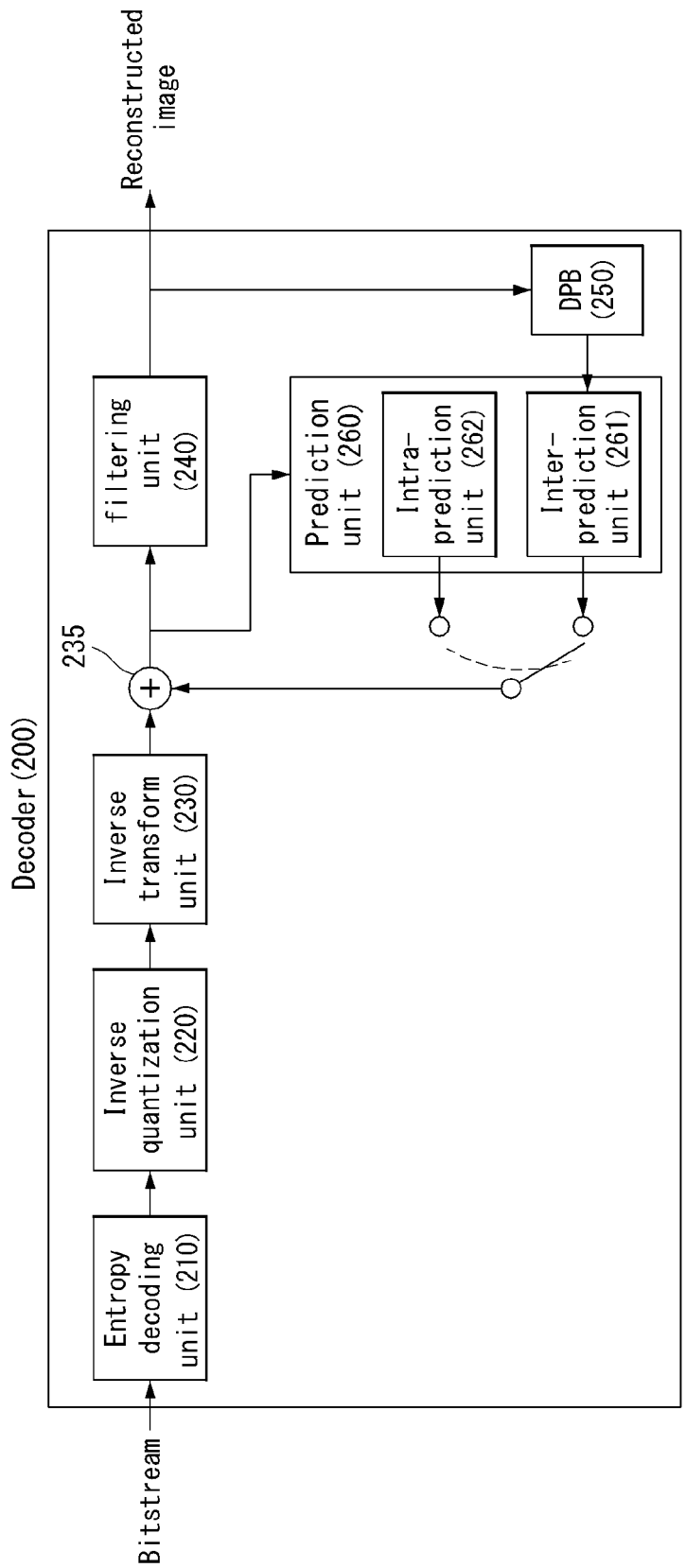

[FIG. 3]
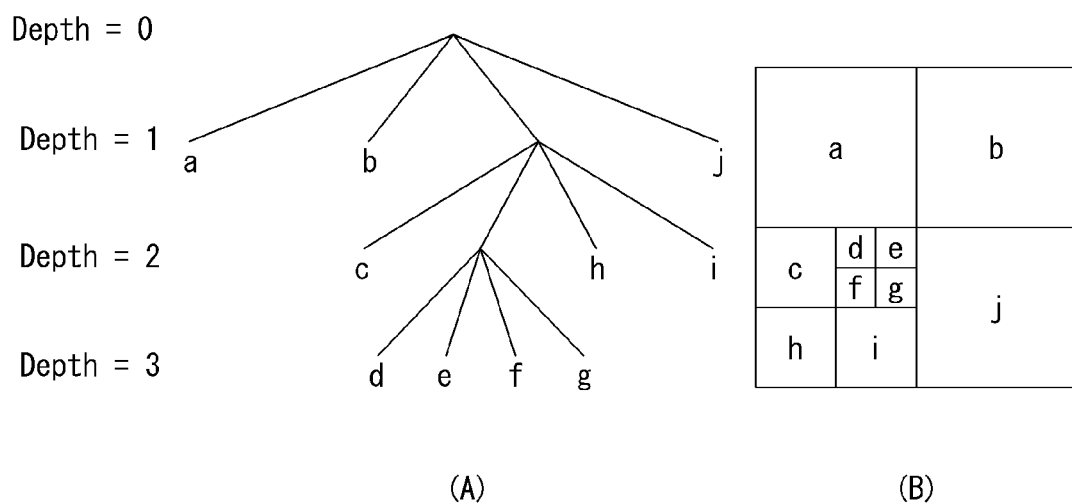

[FIG. 4]
Intra:
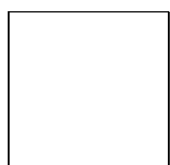
2Nx2N
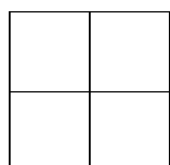
NxN
Inter:
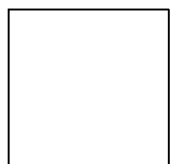
2Nx2N
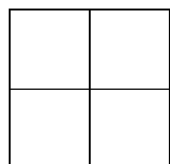
NxN
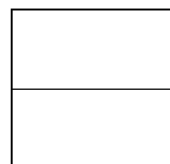
2NxN
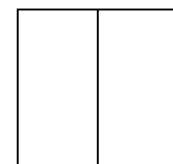
Nx2N
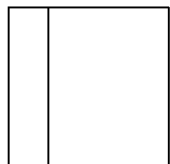
nLx2N
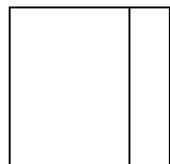
nRx2N
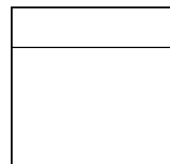
2NxnU
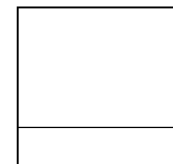
2NxnD

[FIG. 5]
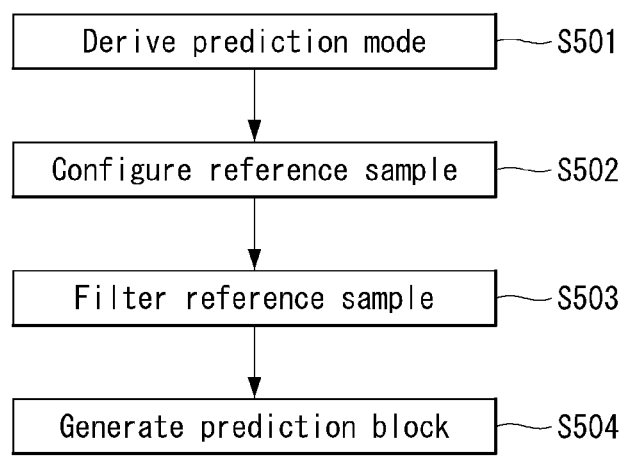

[FIG. 6]
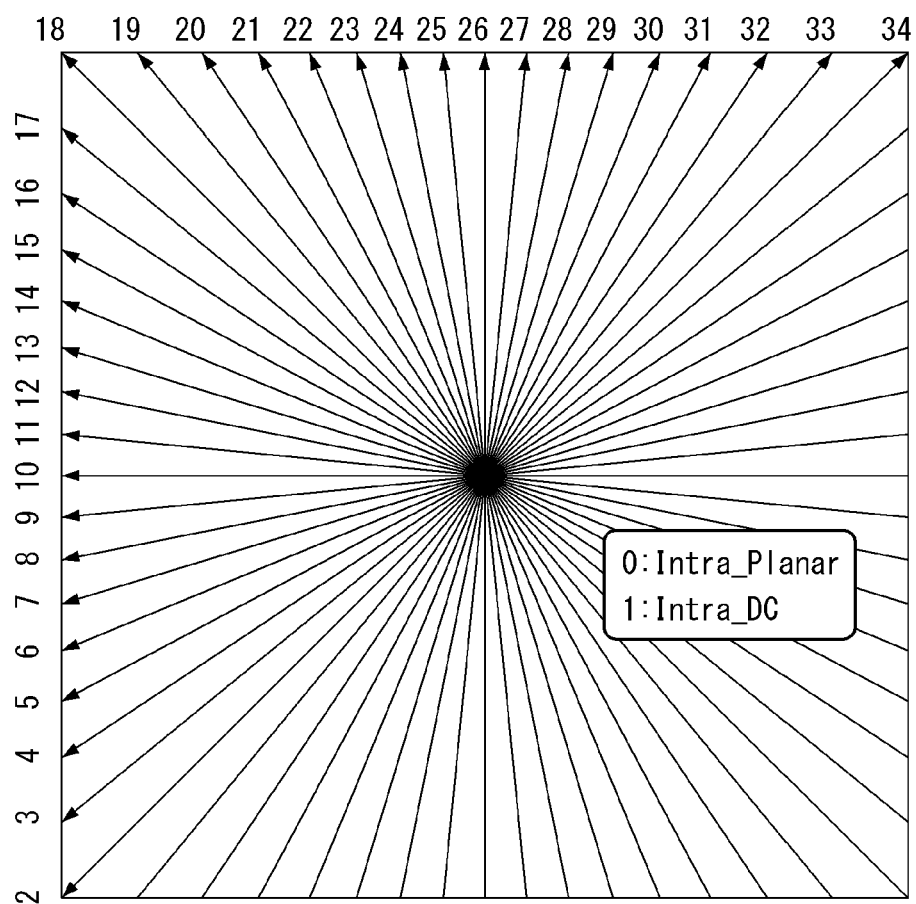

[FIG. 7]
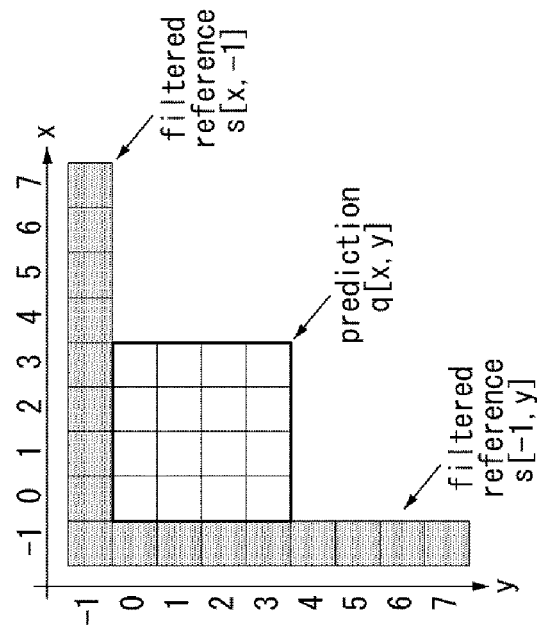
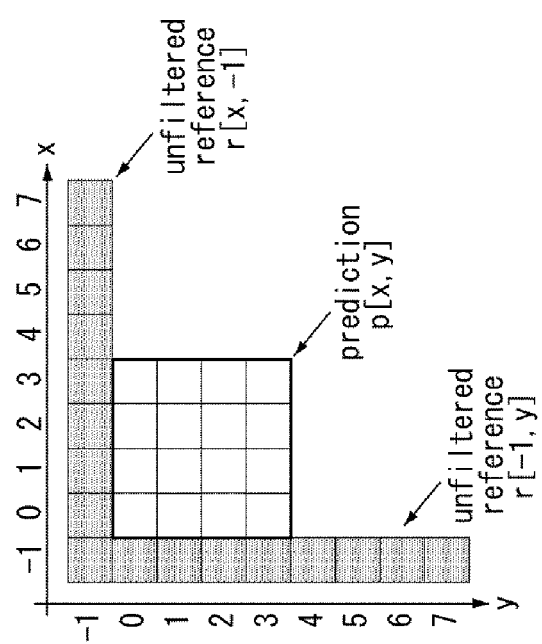

【FIG. 8】
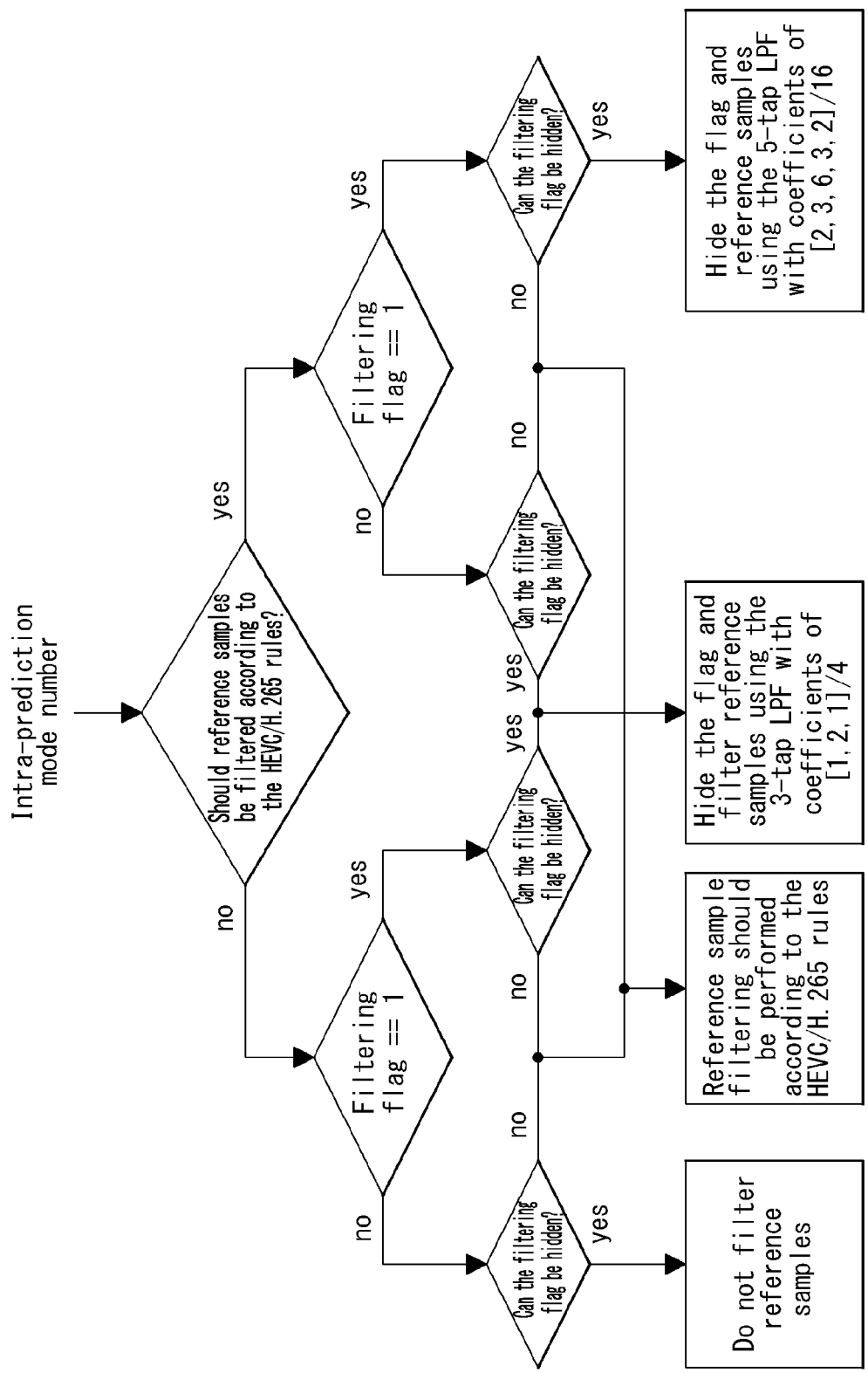

[FIG. 9]
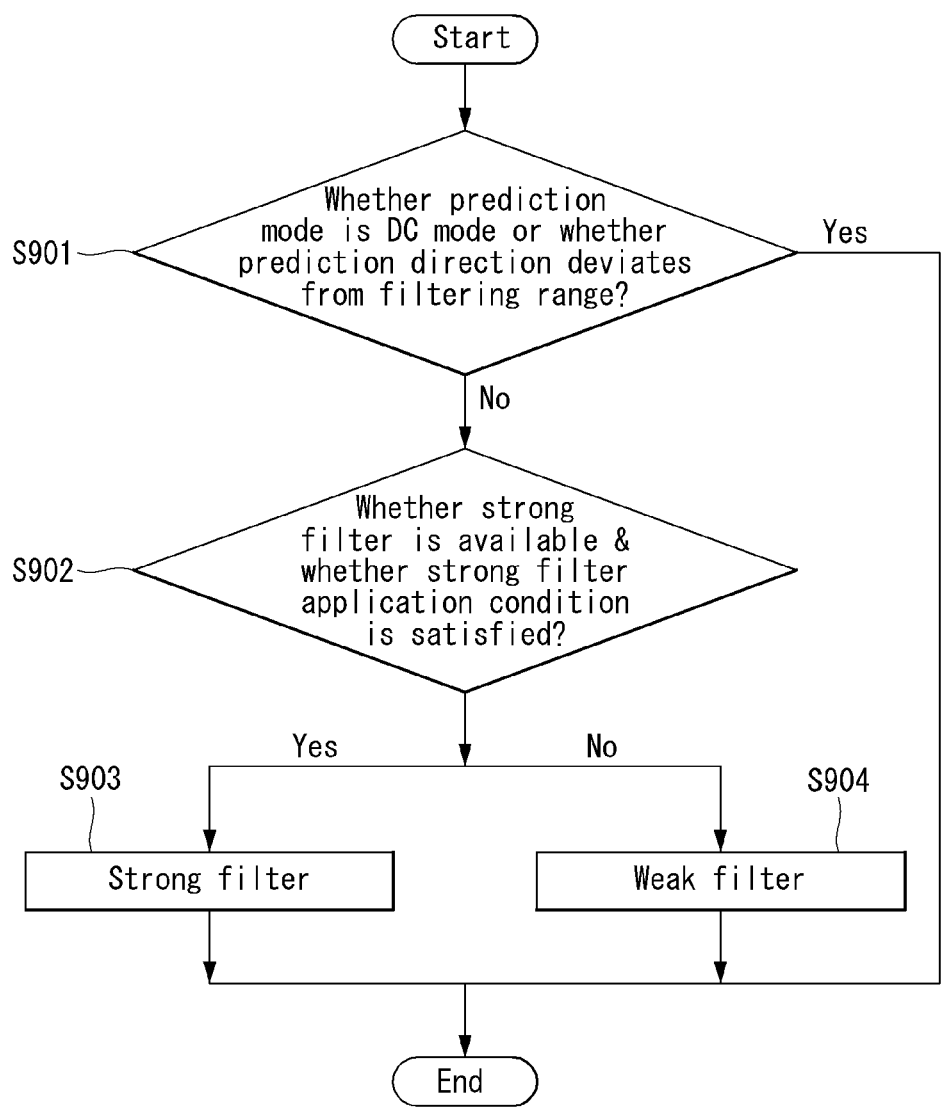

[FIG. 10]
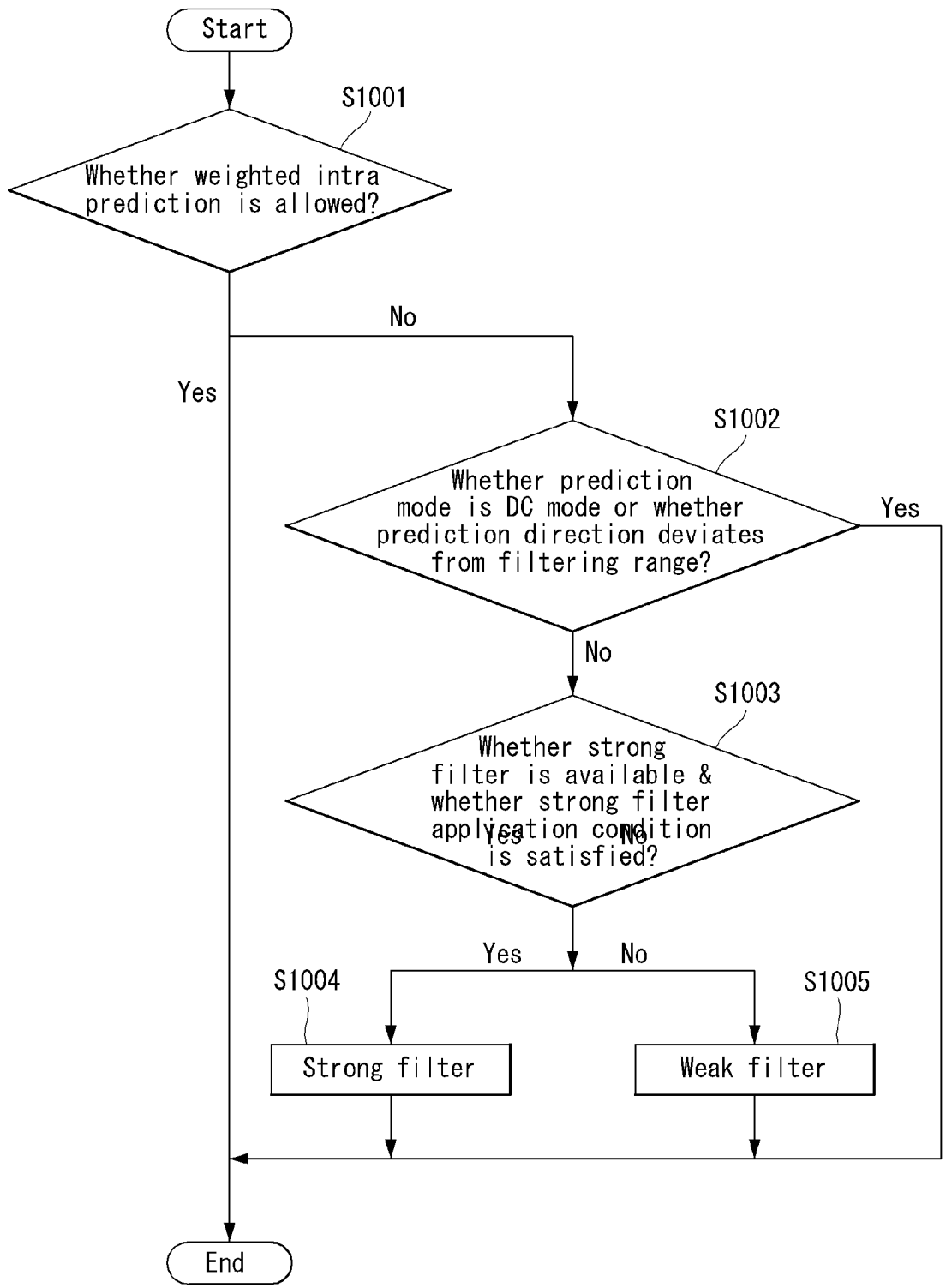

[FIG. 11]
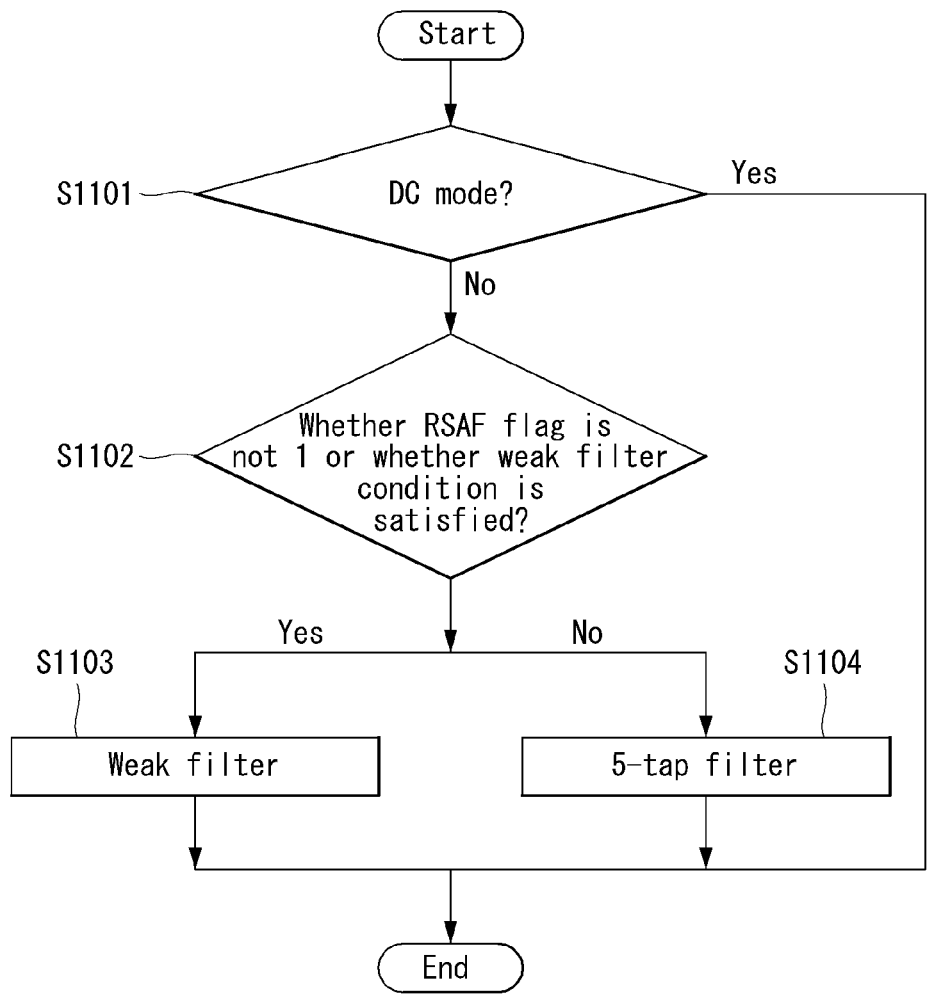

[FIG. 12]
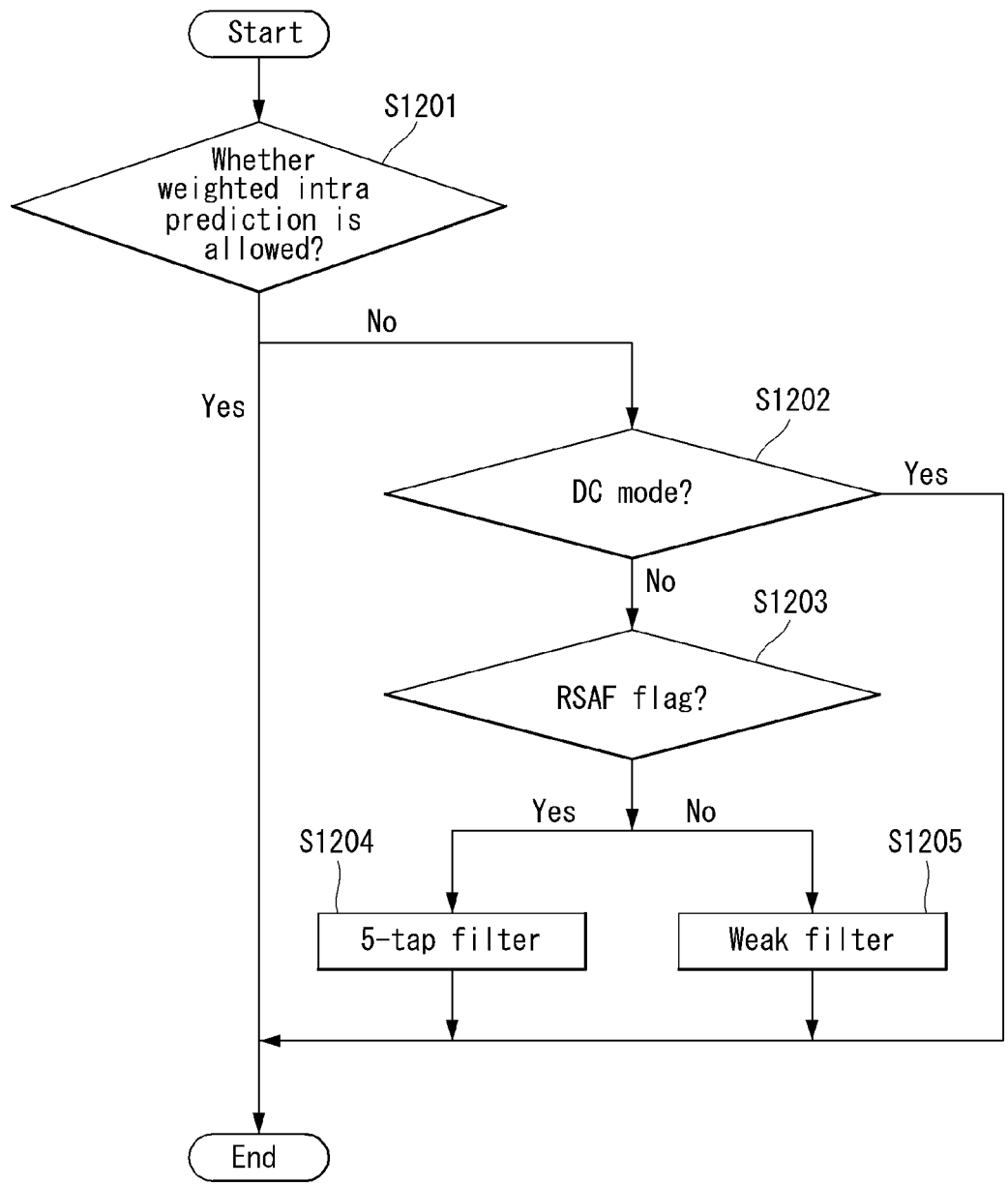

[FIG. 13]
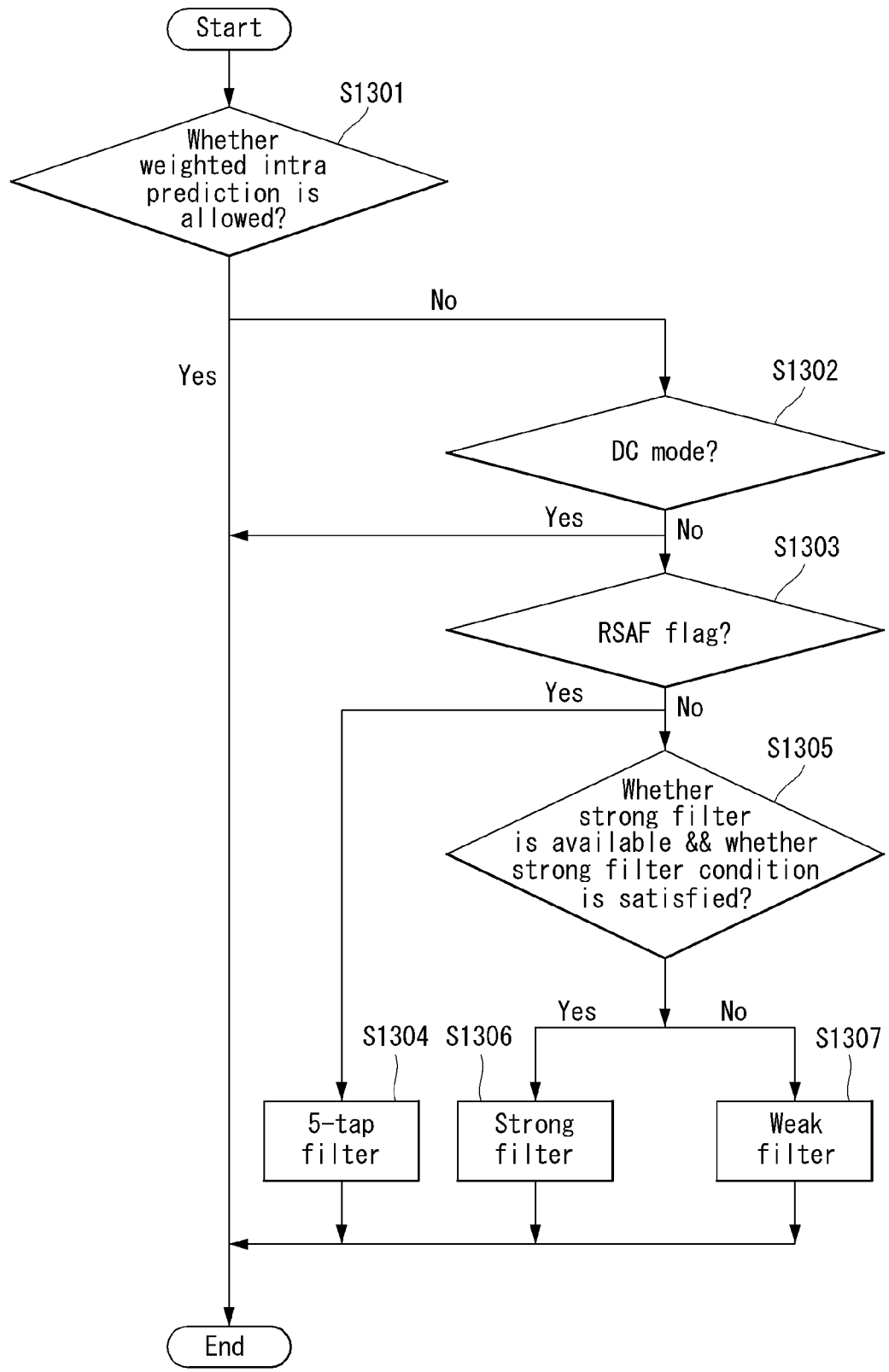

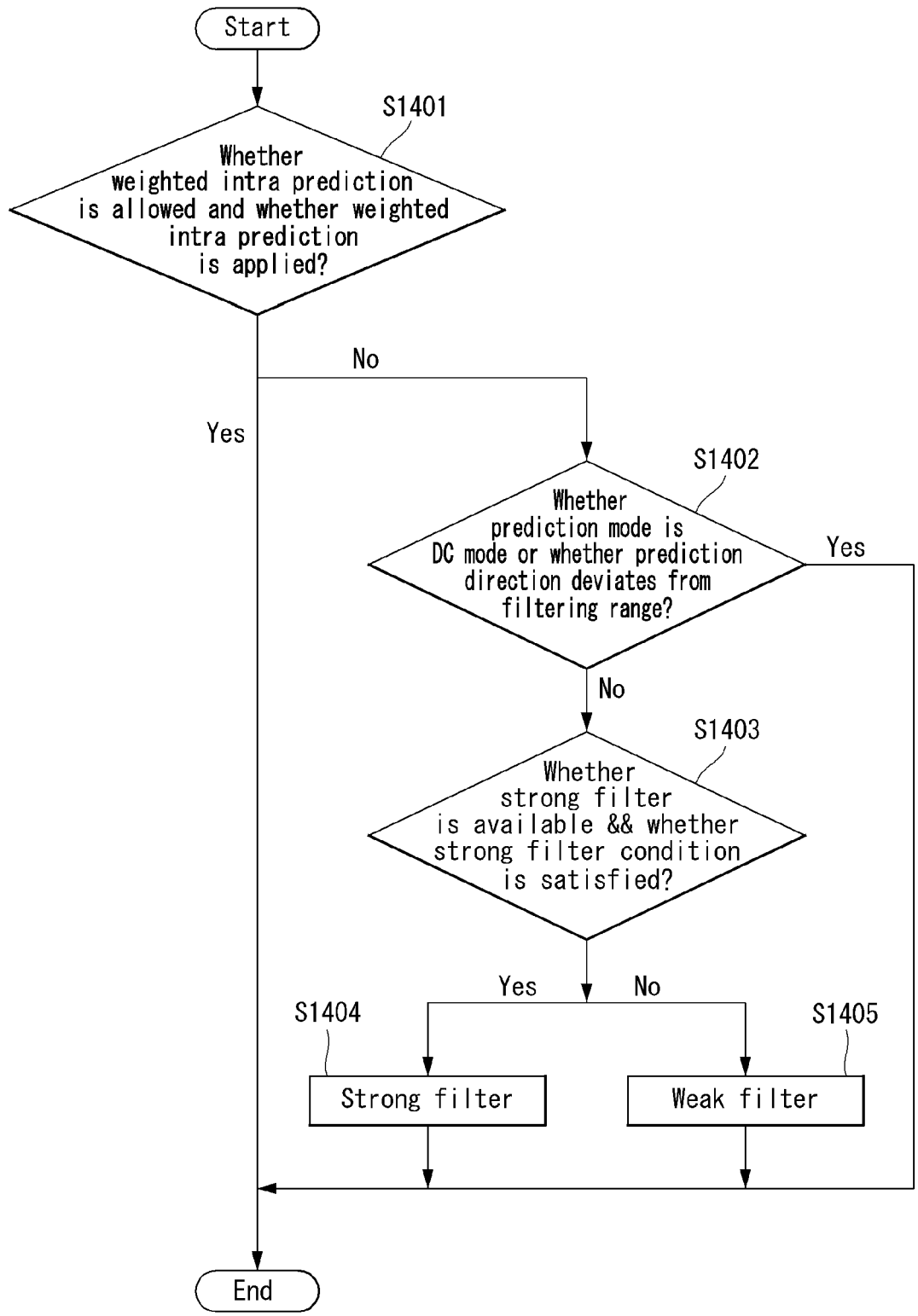
[FIG. 14]

[FIG. 15]
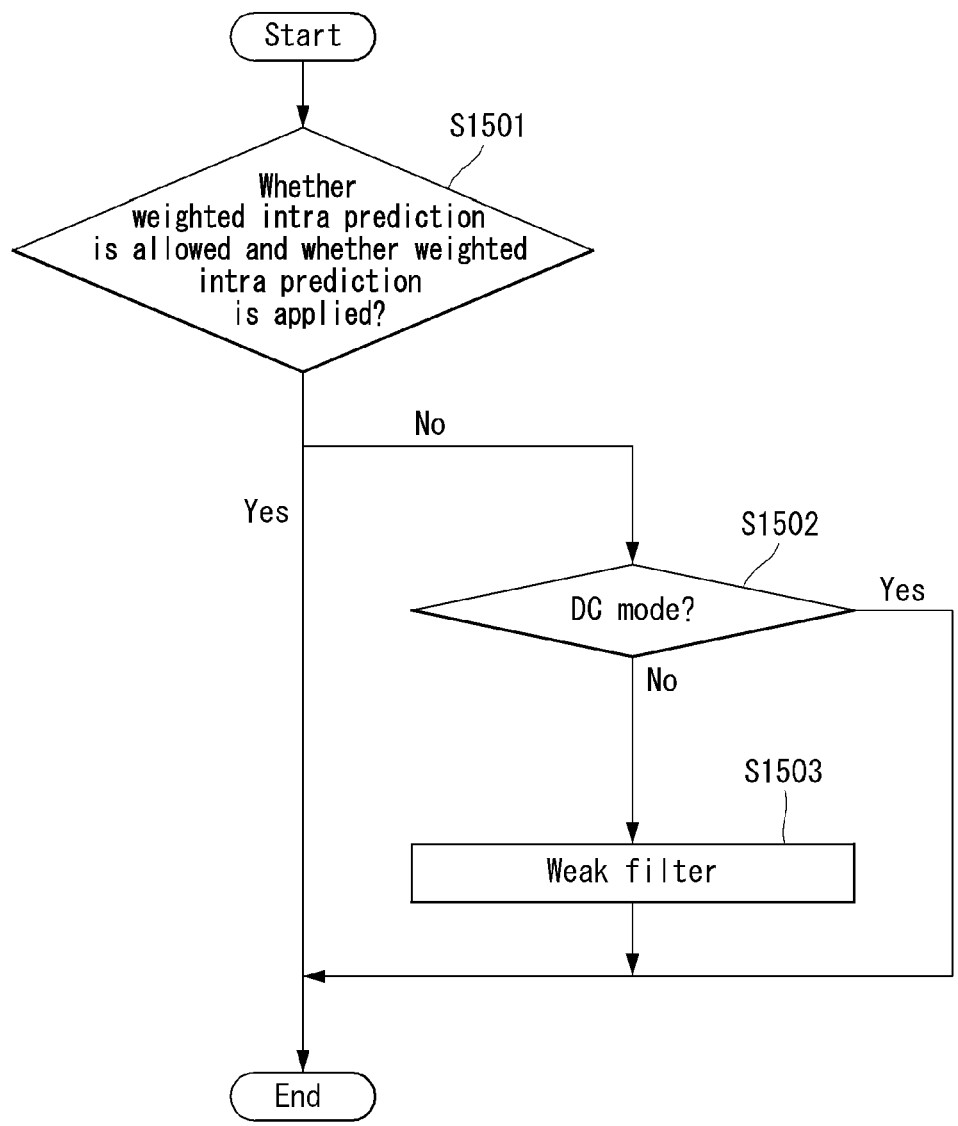

【FIG. 16】
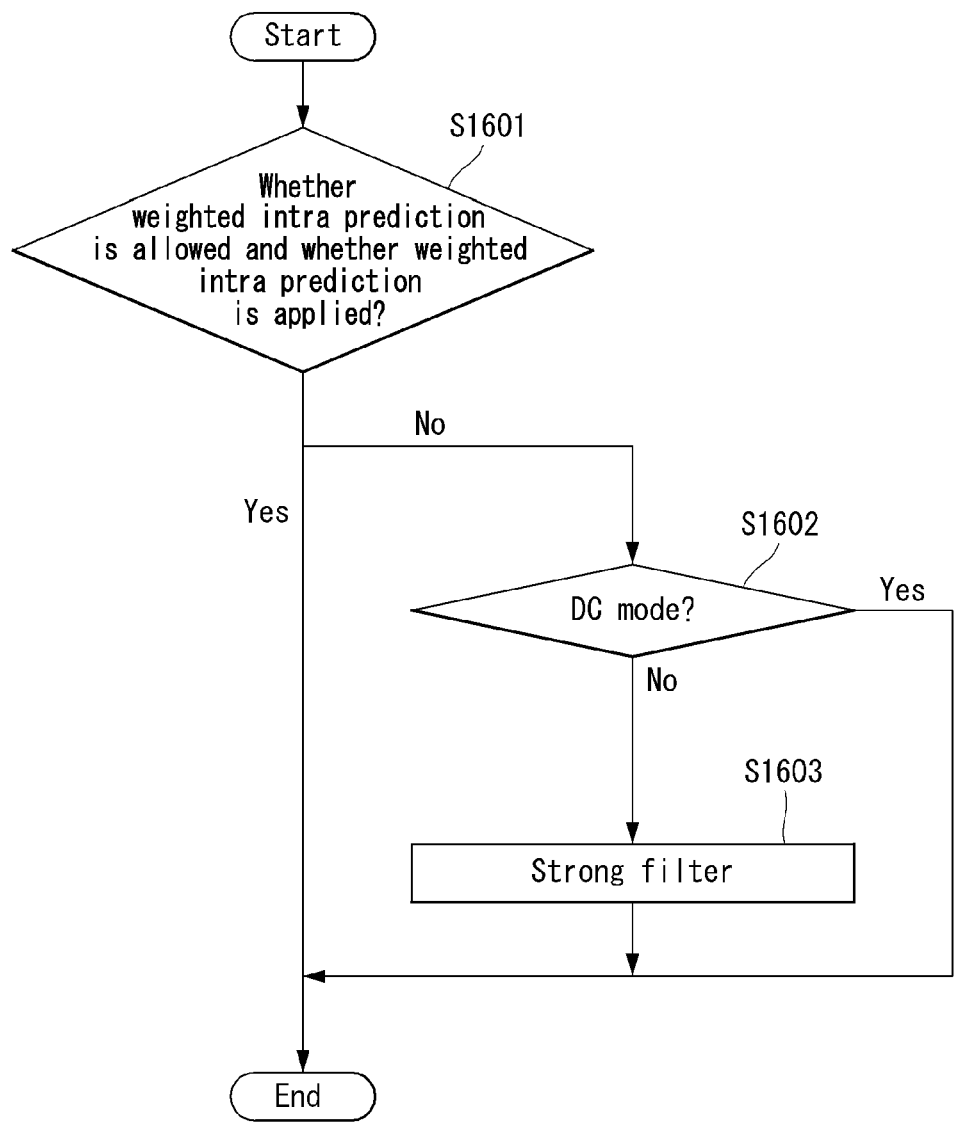

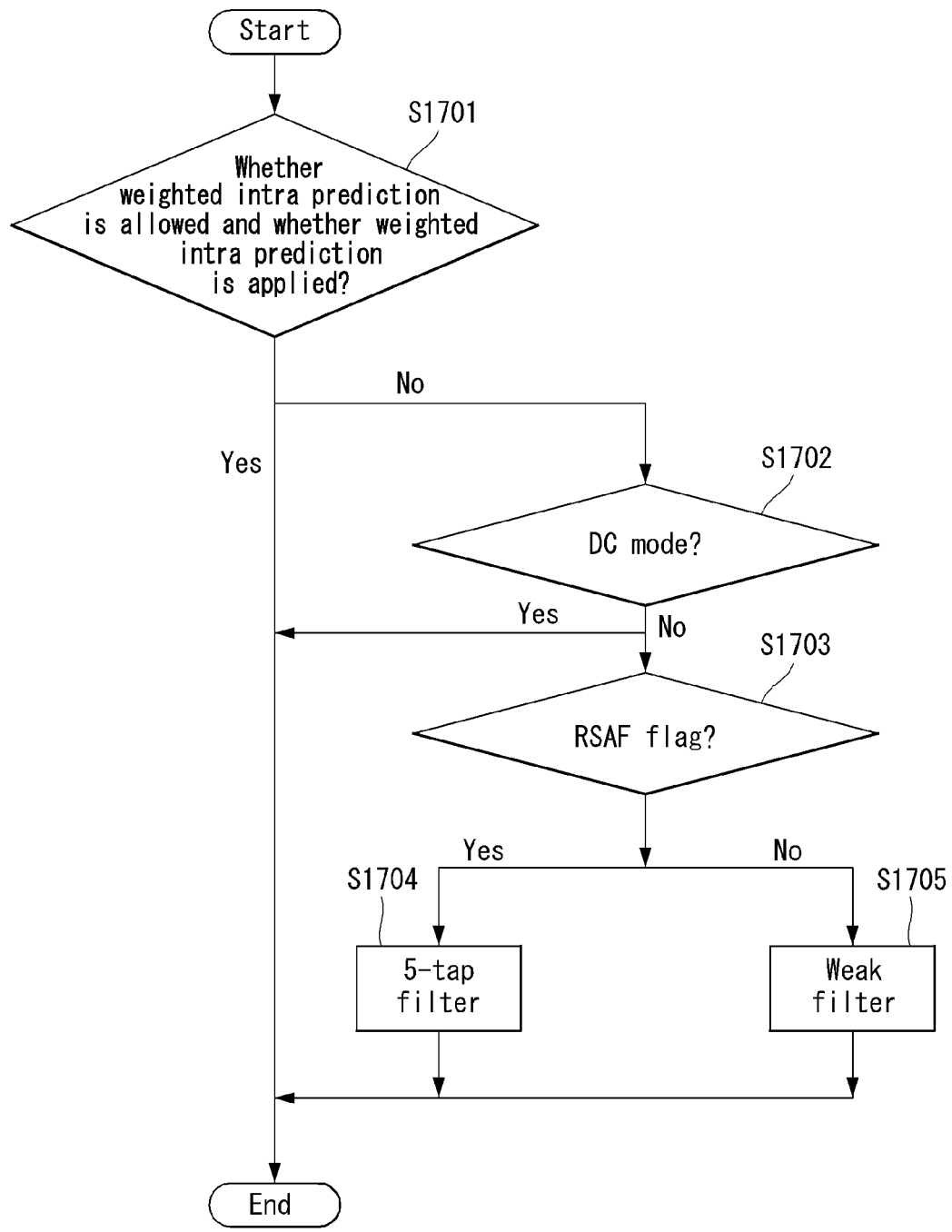
[FIG. 17]

[FIG. 18]
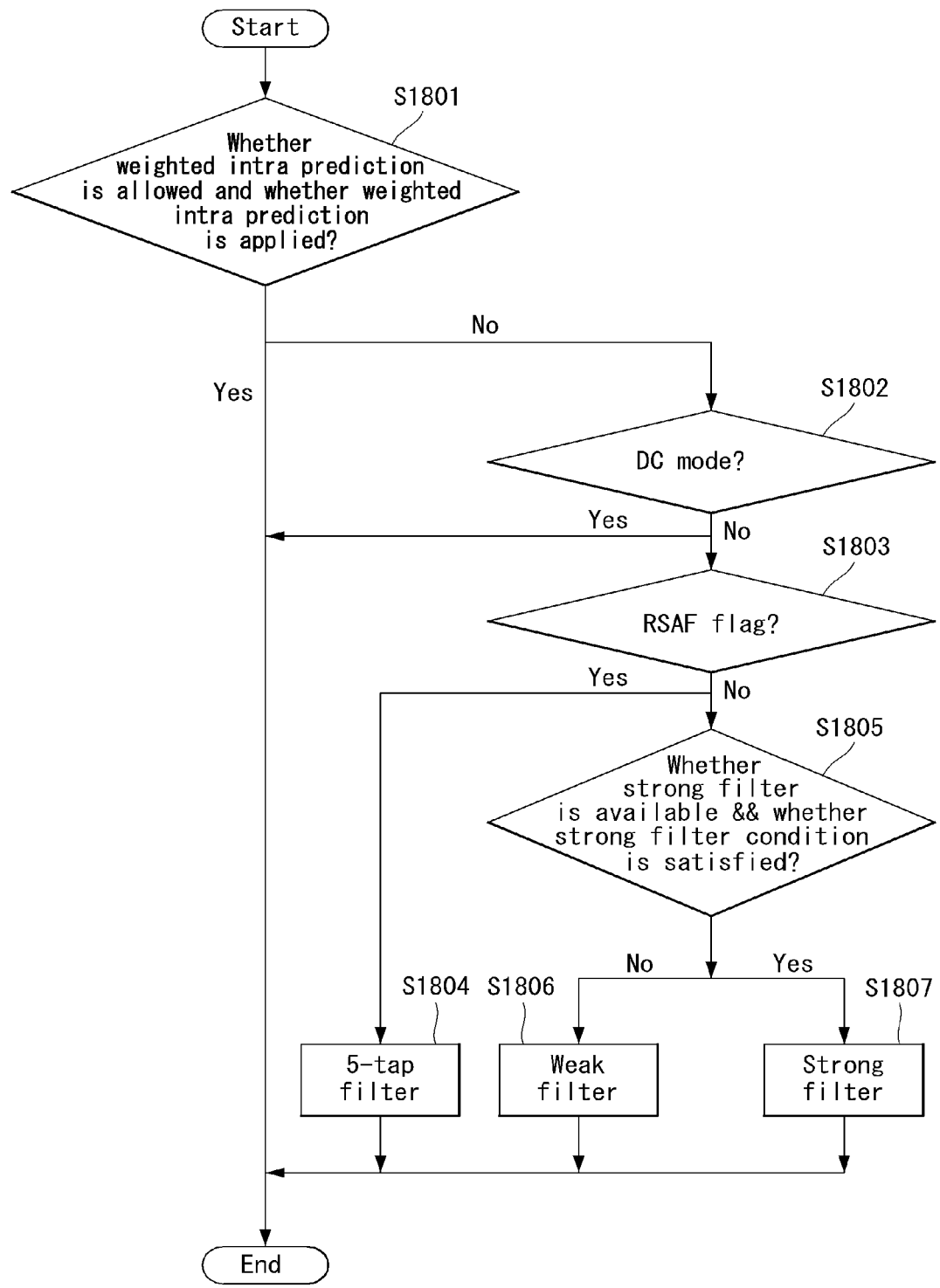

[FIG. 19]
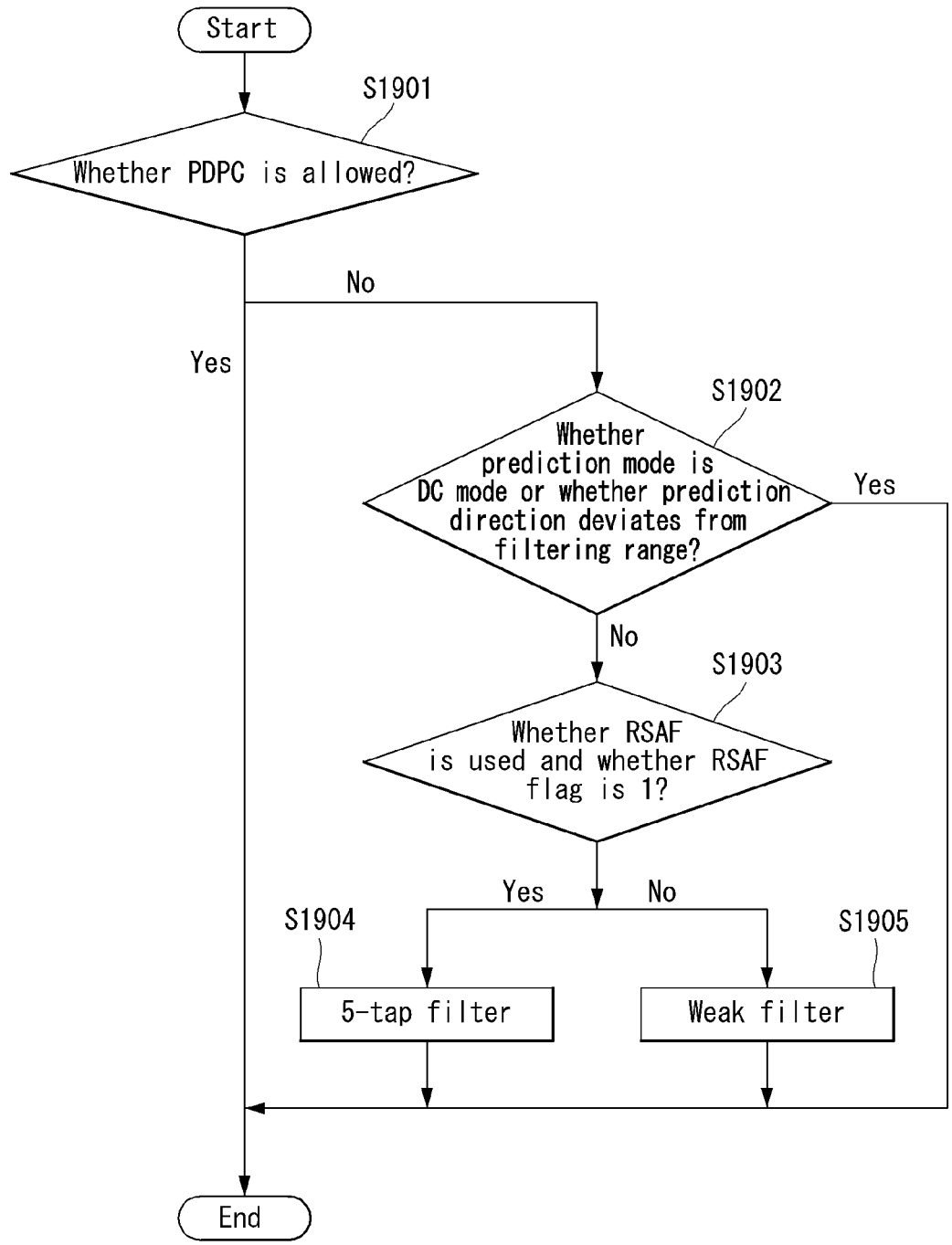

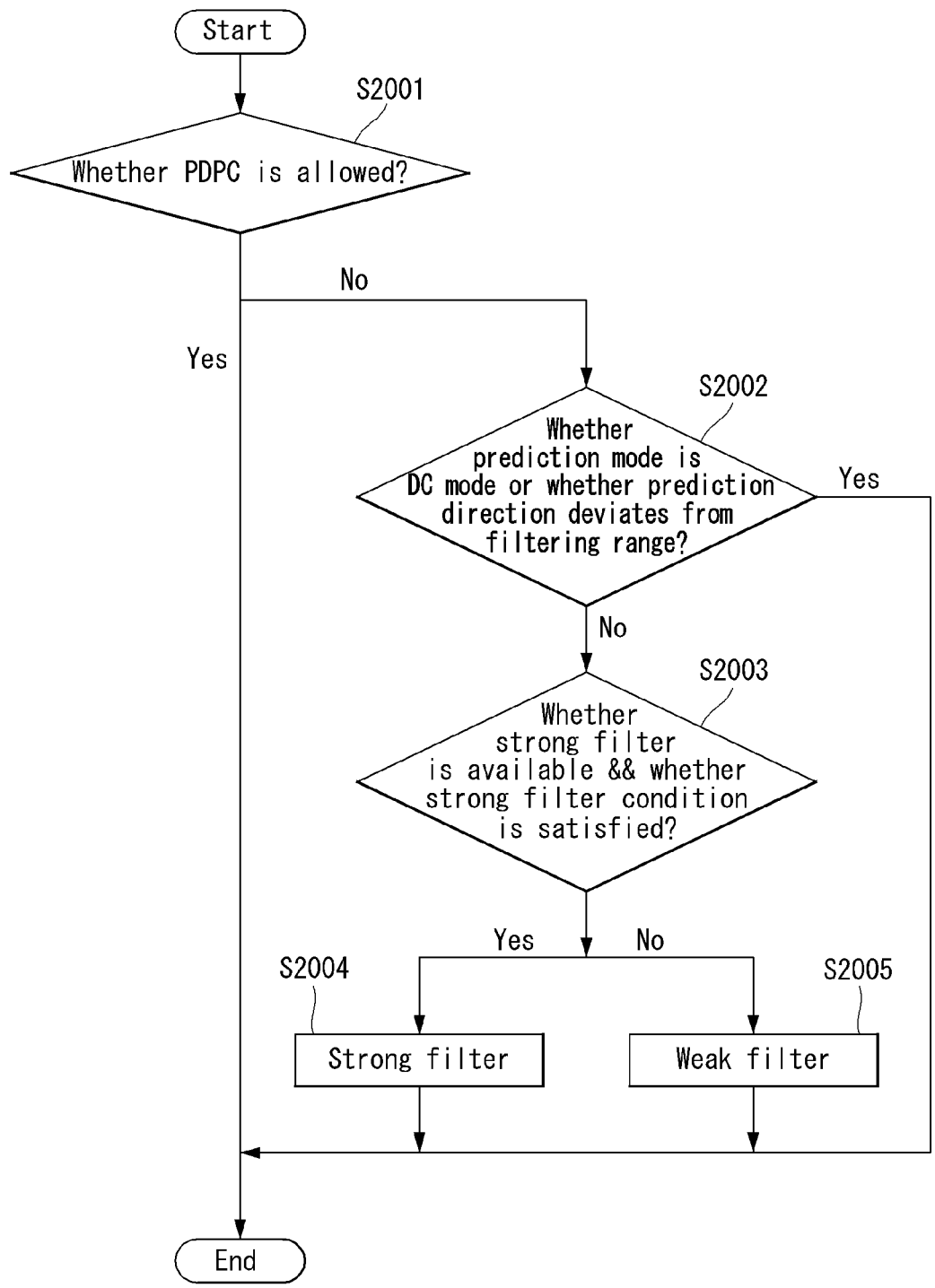
[FIG. 20]

[FIG. 21]
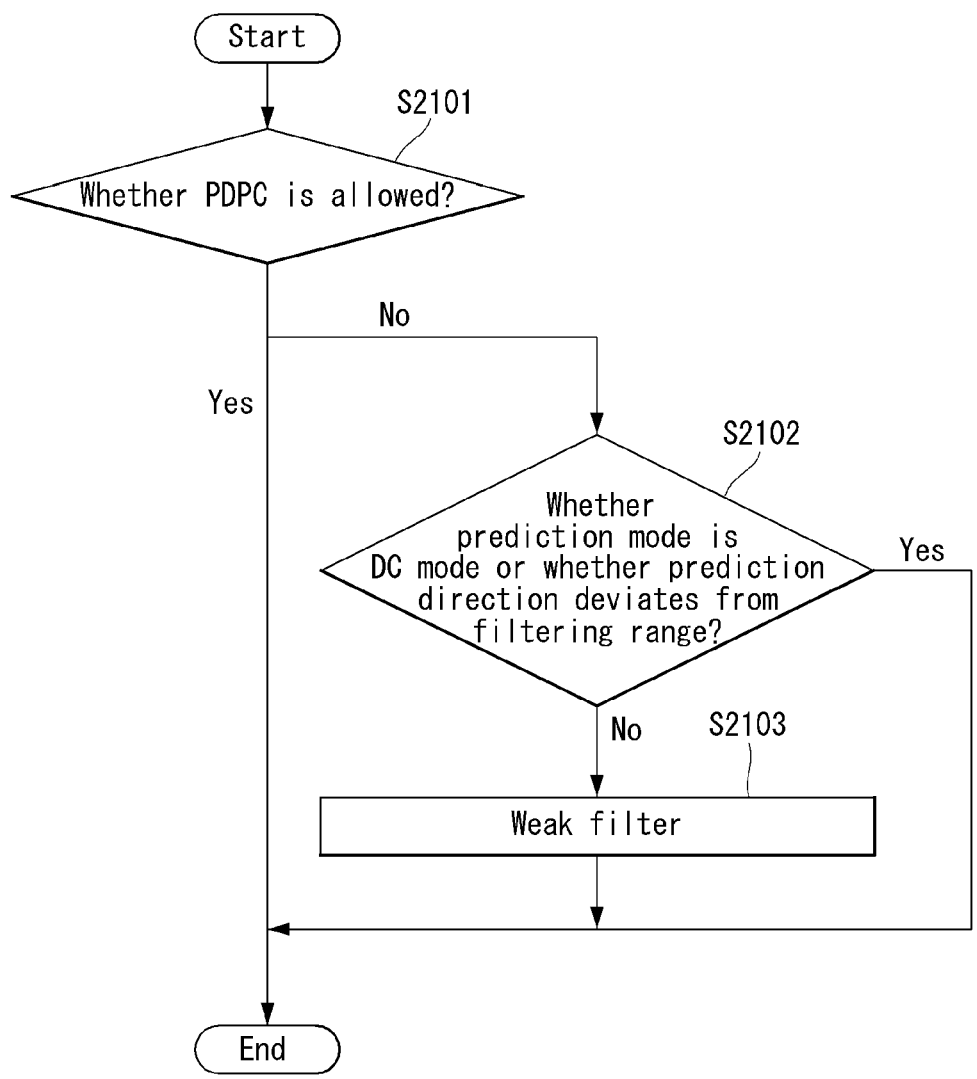

[FIG. 22]
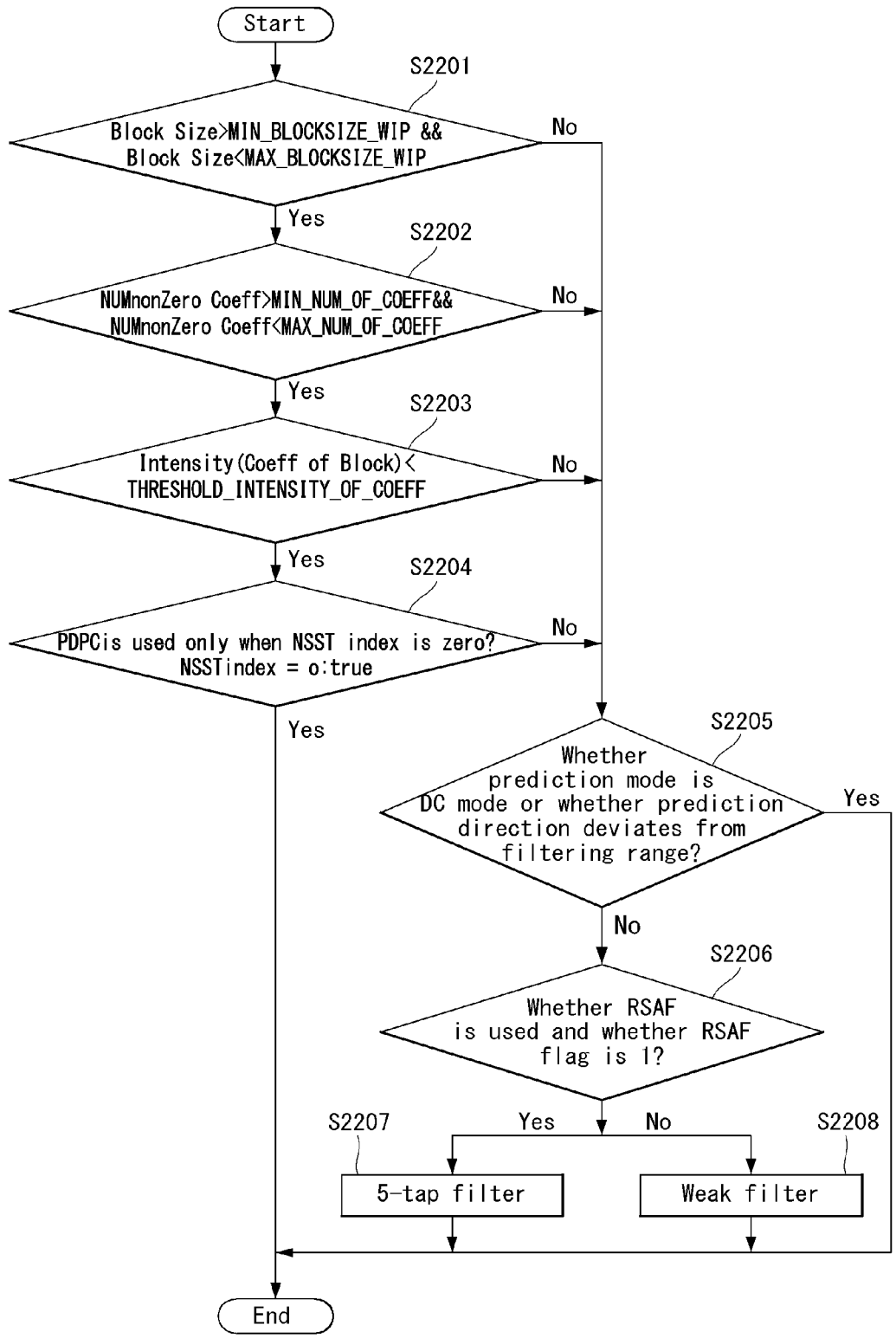

[FIG. 23]
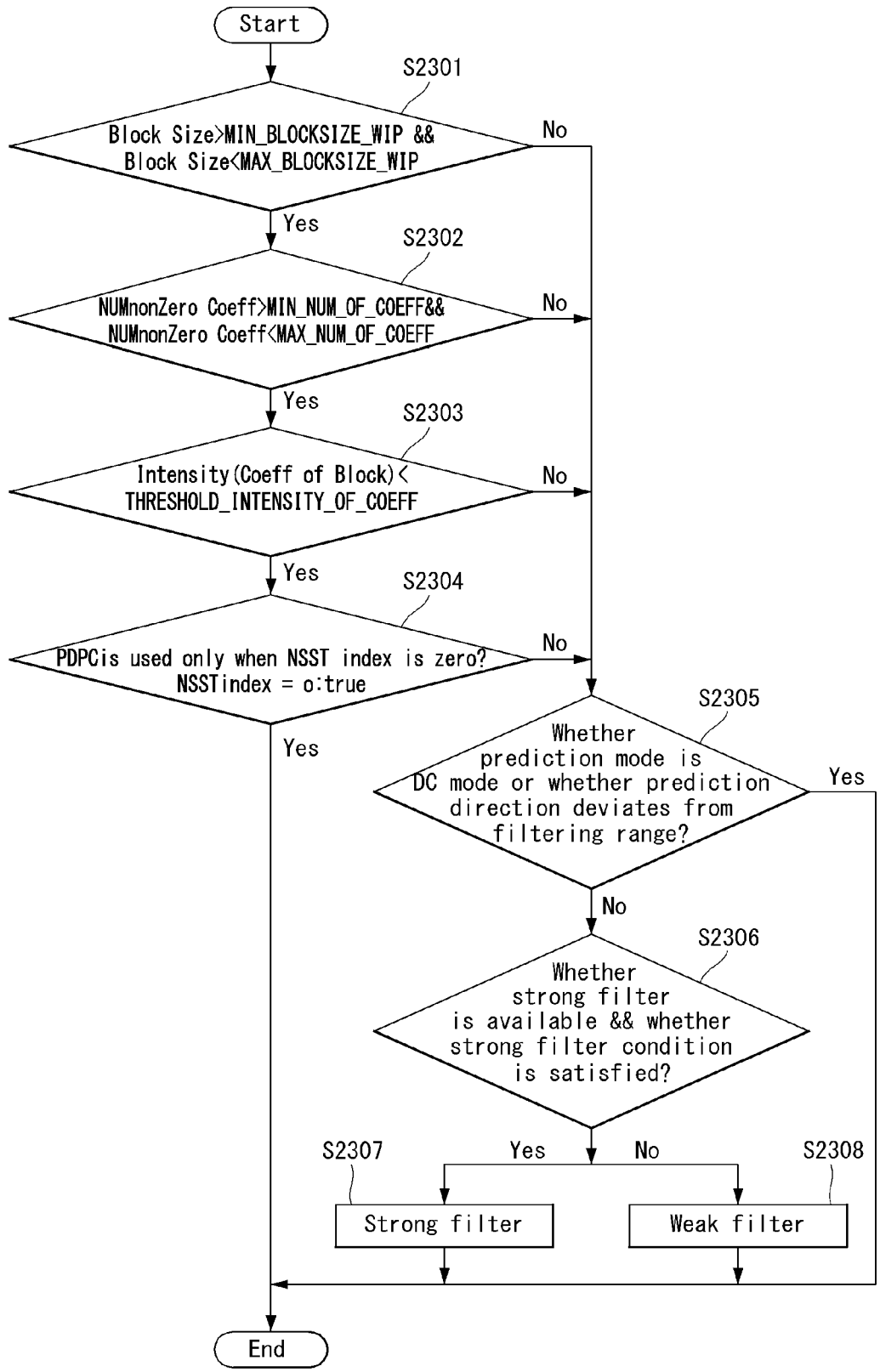

[FIG. 24]
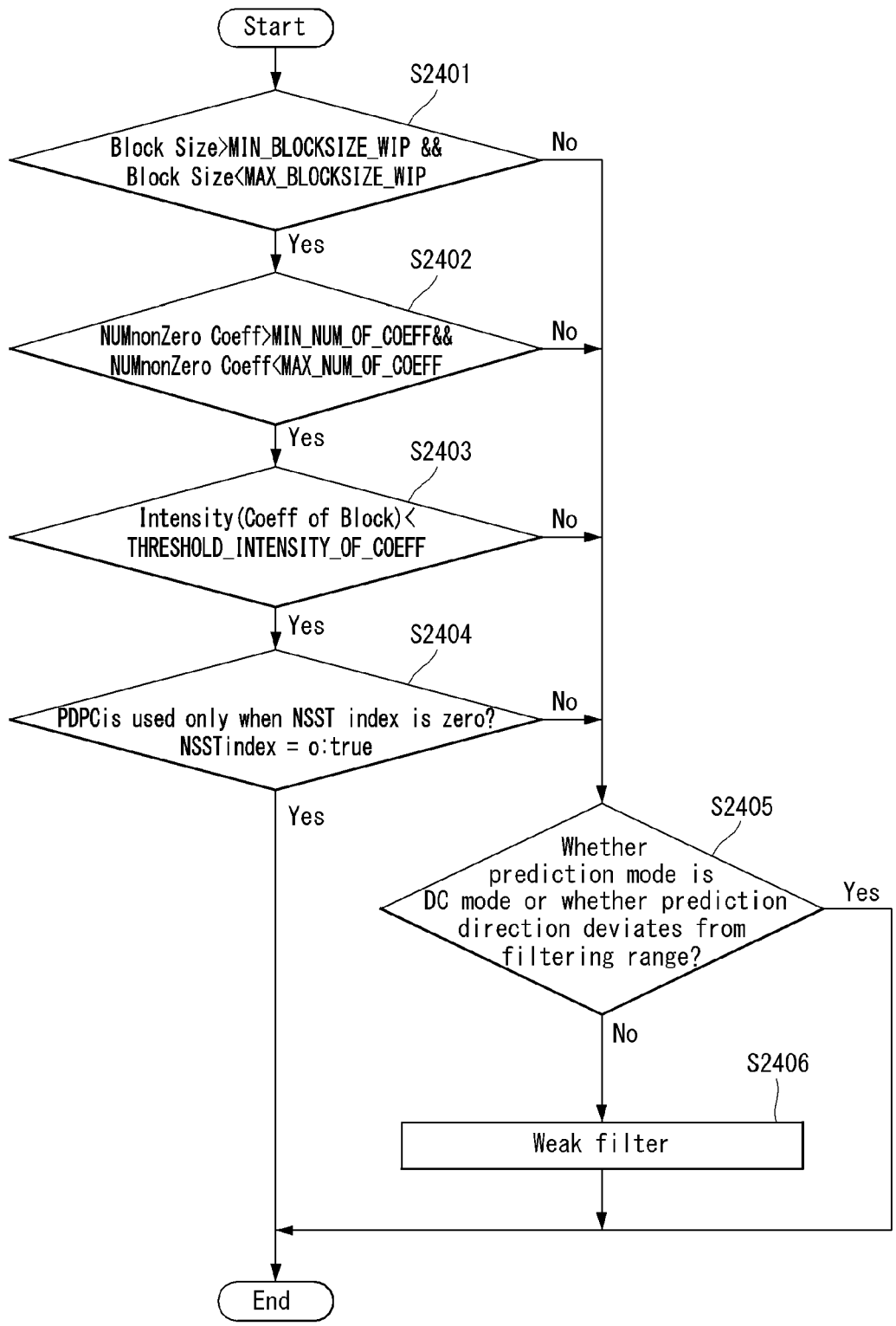

[FIG. 25]
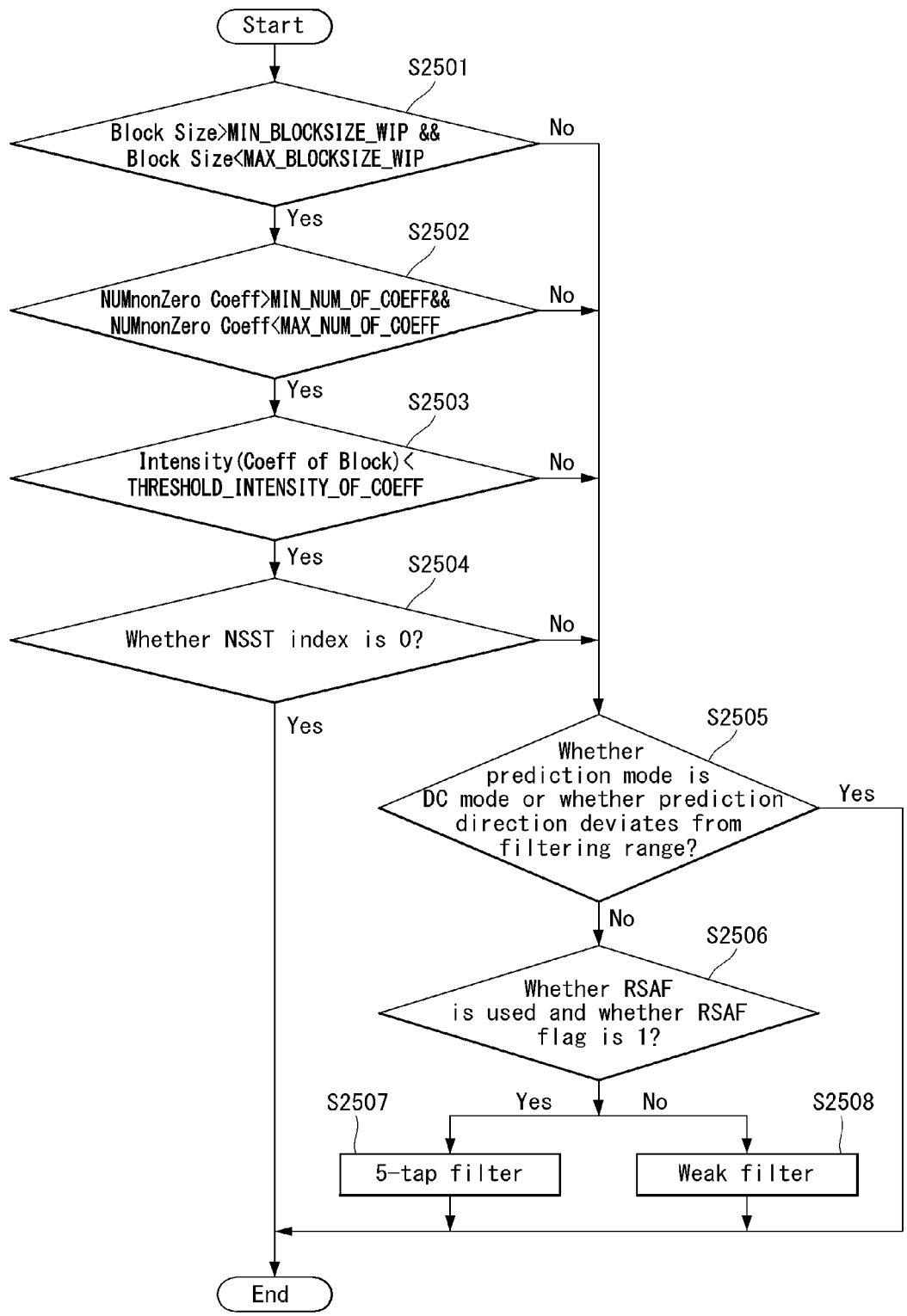

[FIG. 26]
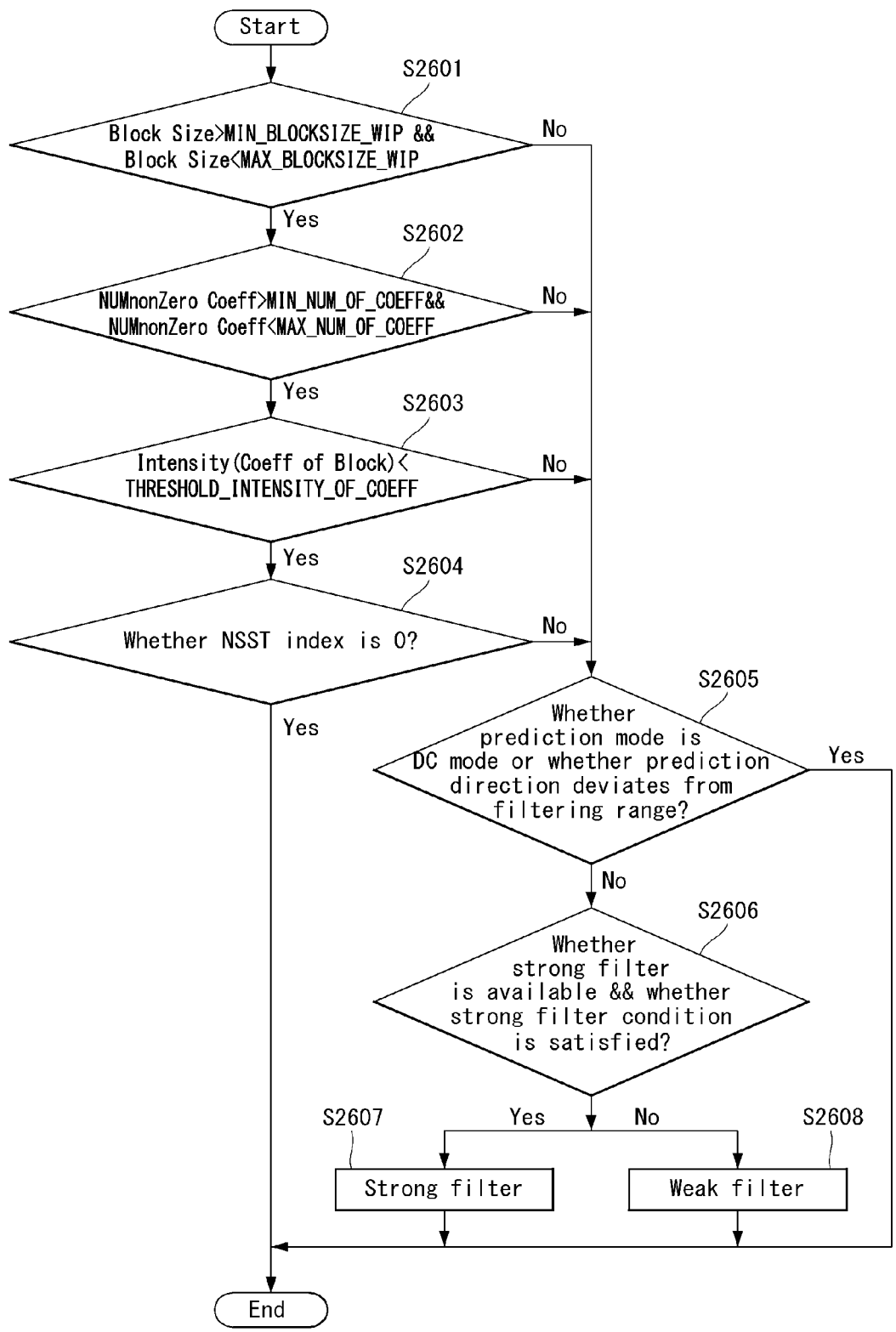

[FIG. 27]
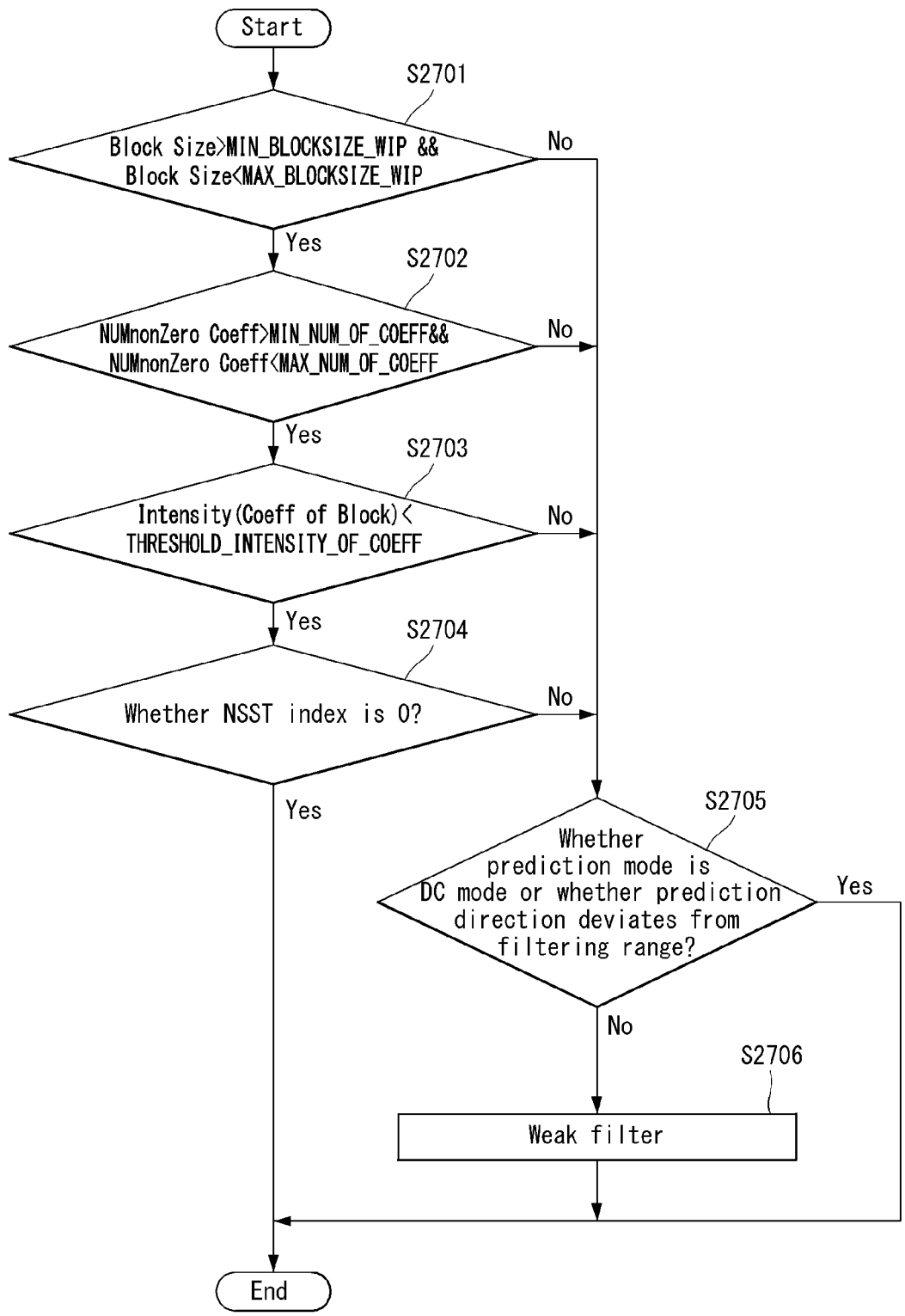

[FIG. 28]
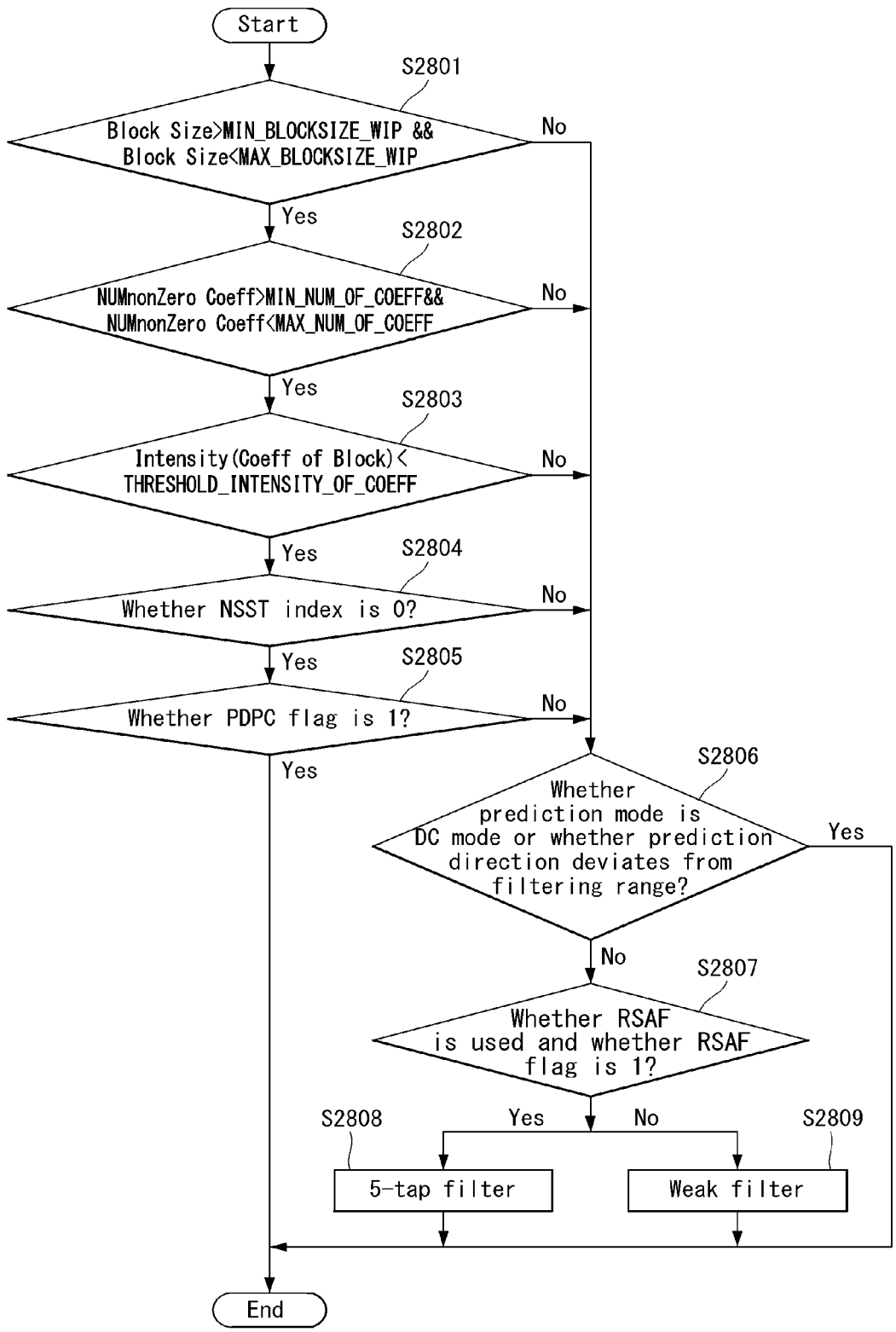

[FIG. 29]
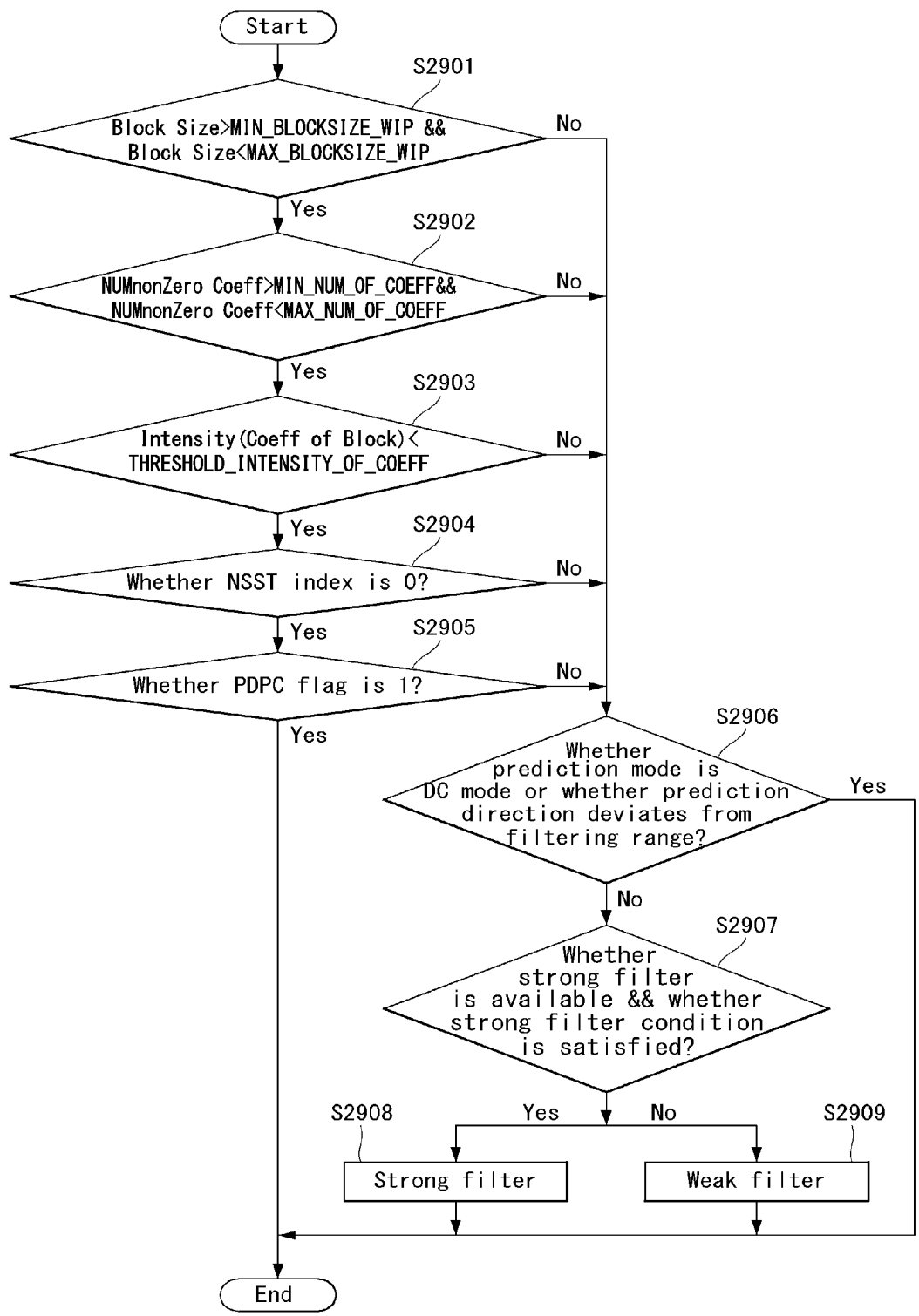

[FIG. 30]
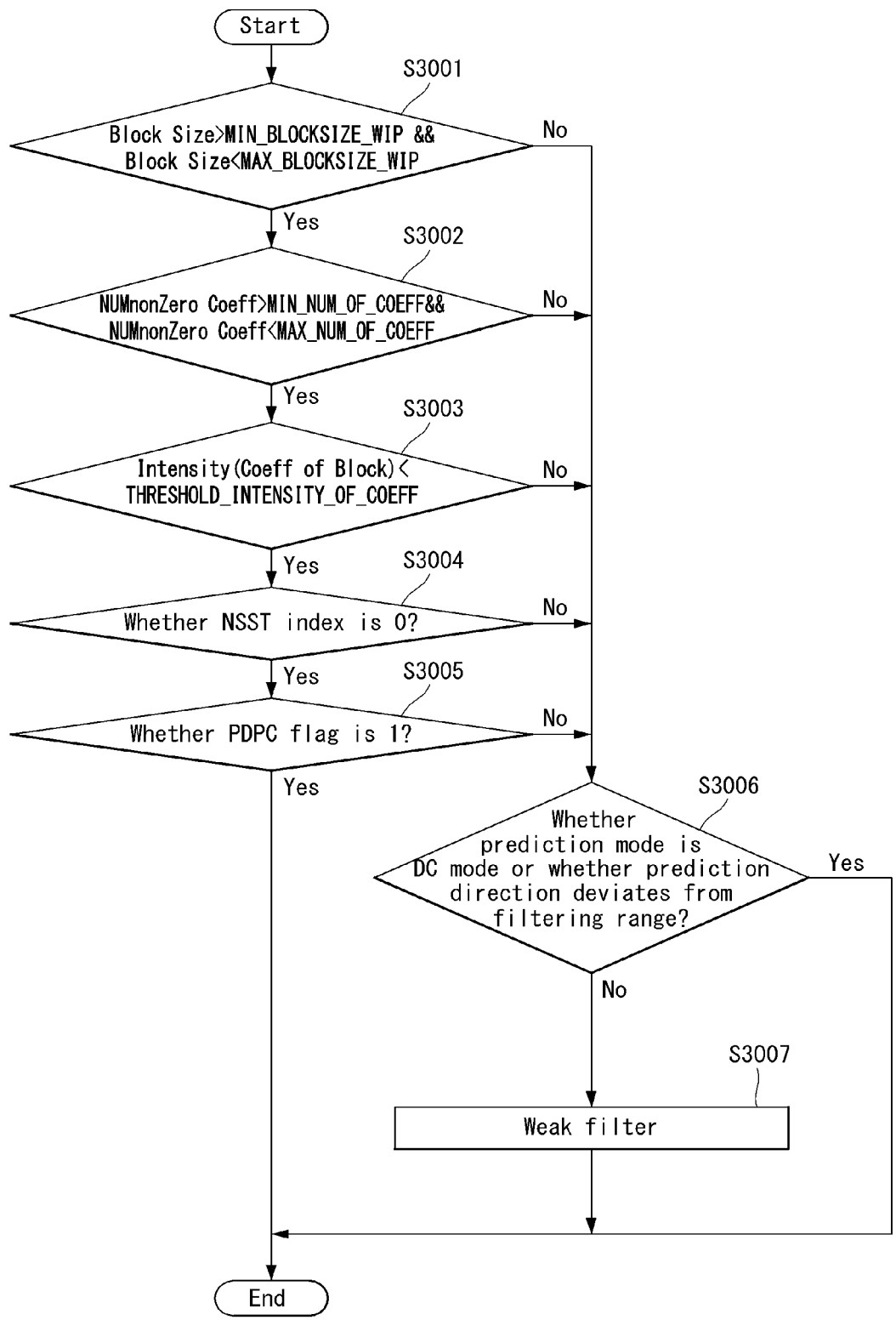

[FIG. 31]
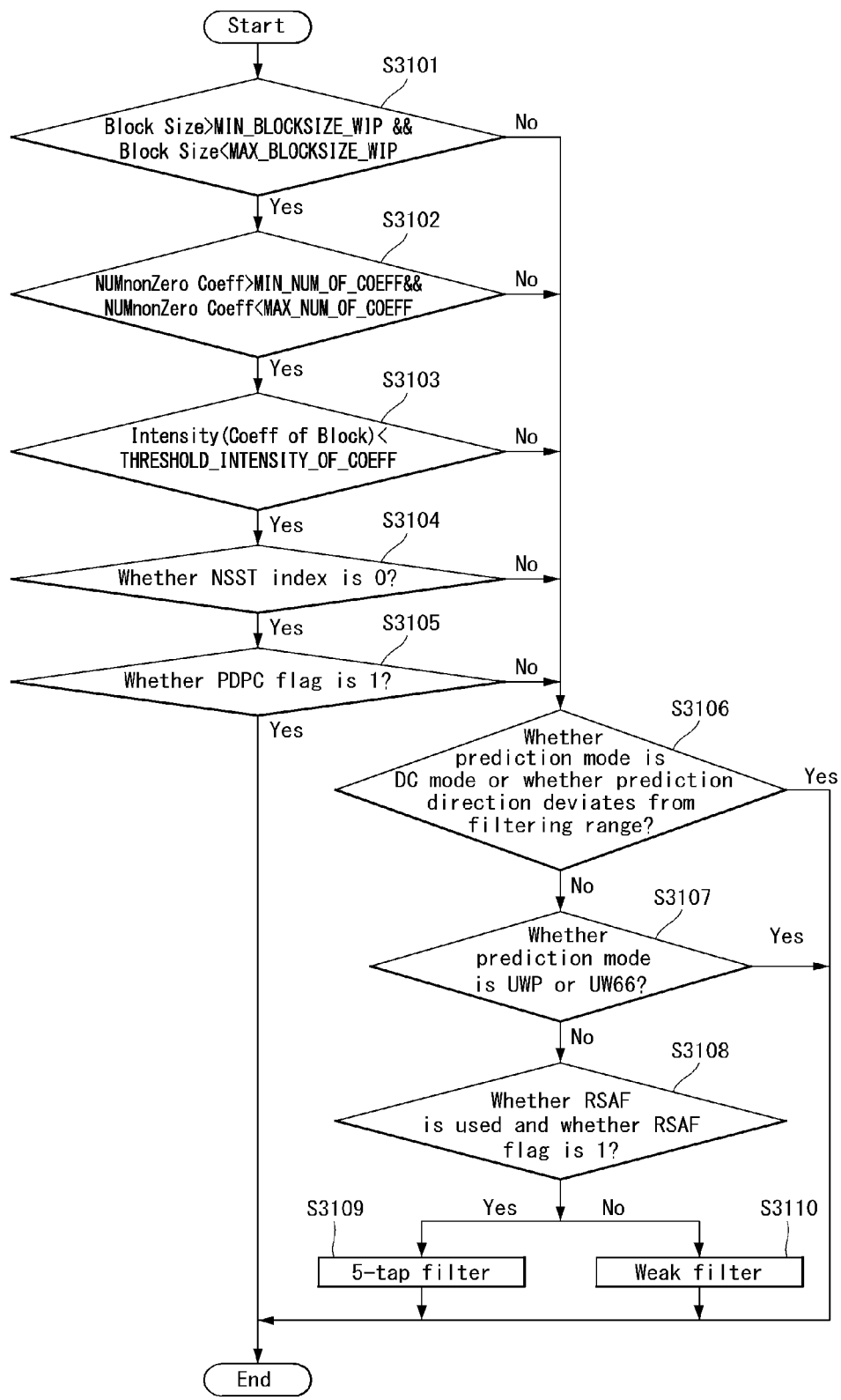

[FIG. 32]
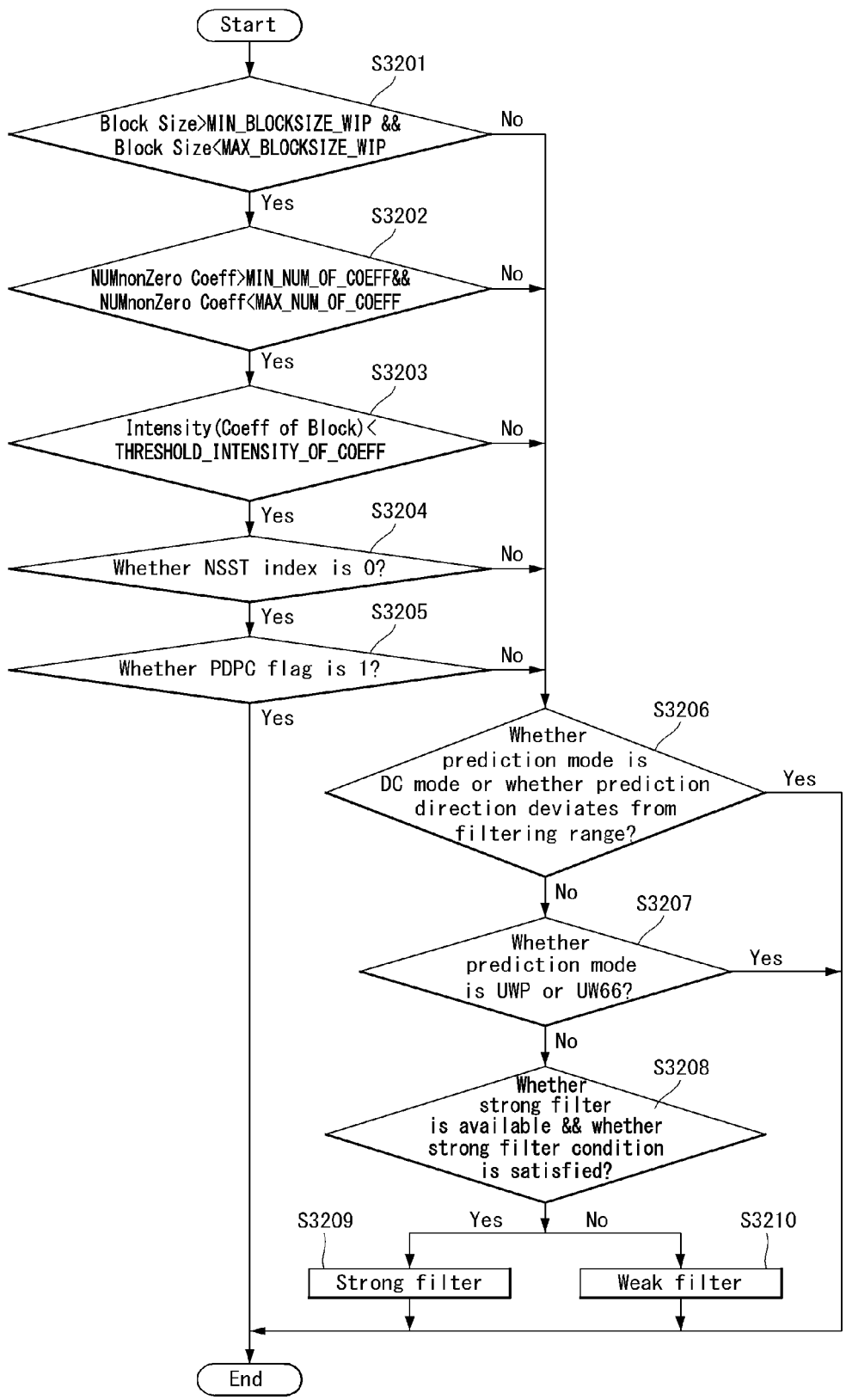

[FIG. 33]
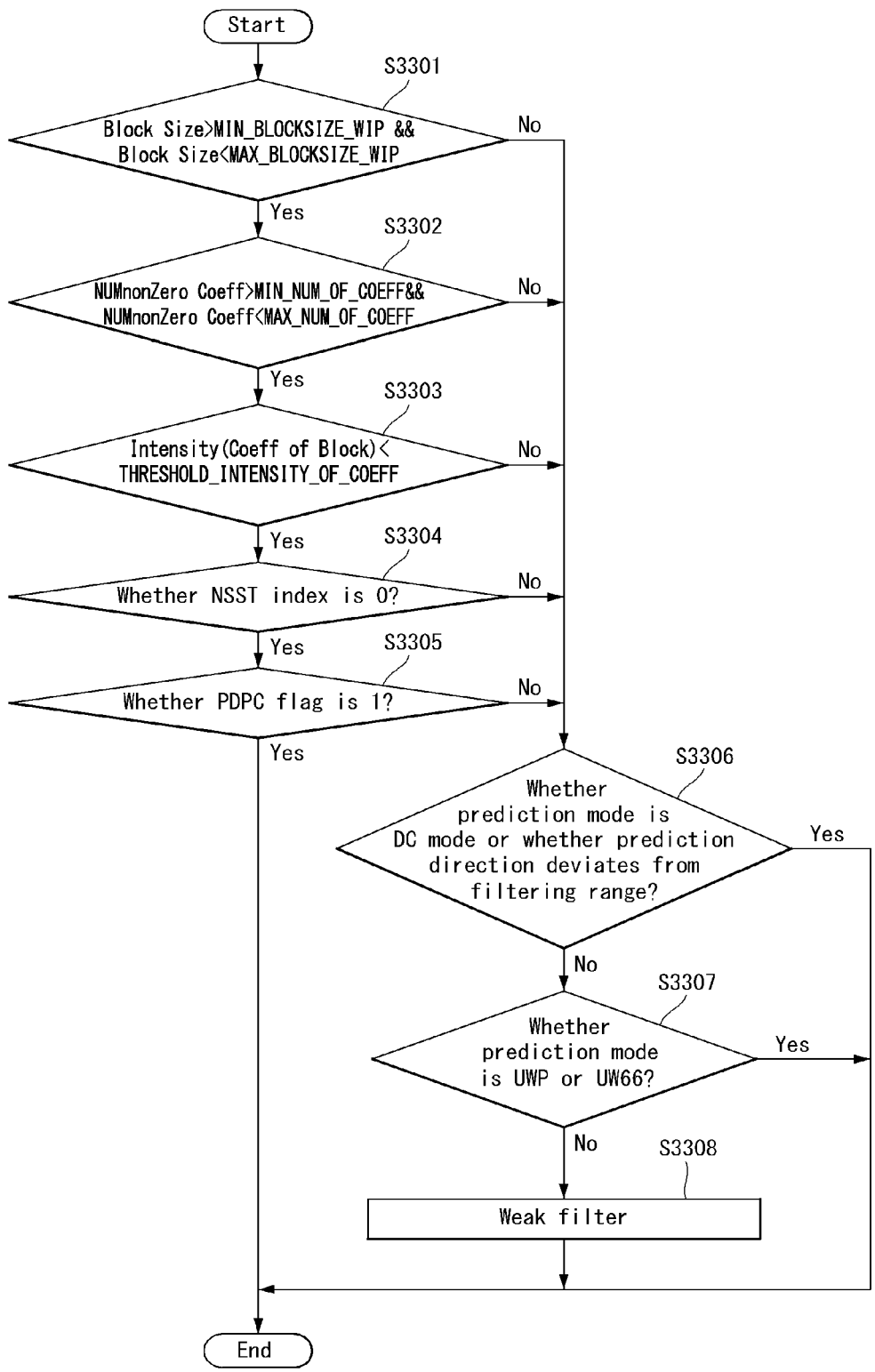

[FIG. 34]
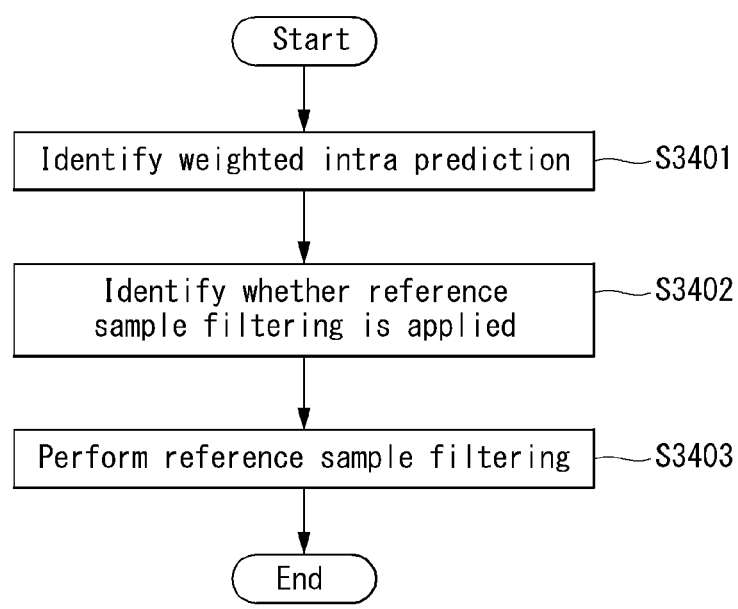

[FIG. 35]
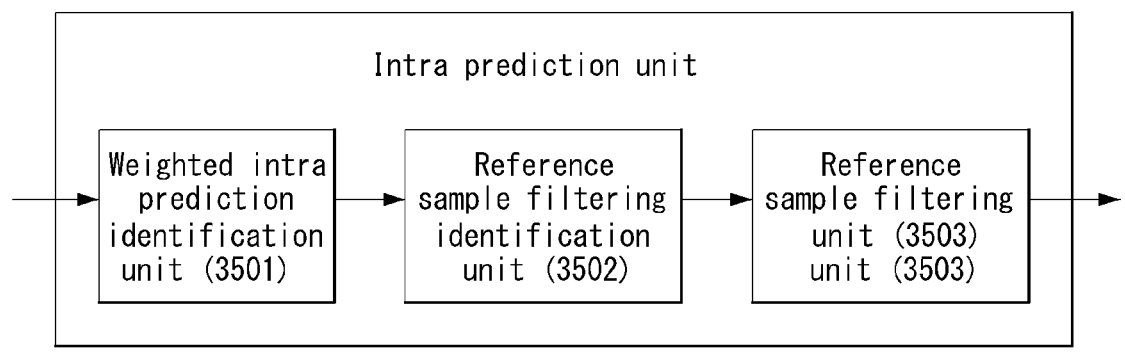

[FIG. 36]
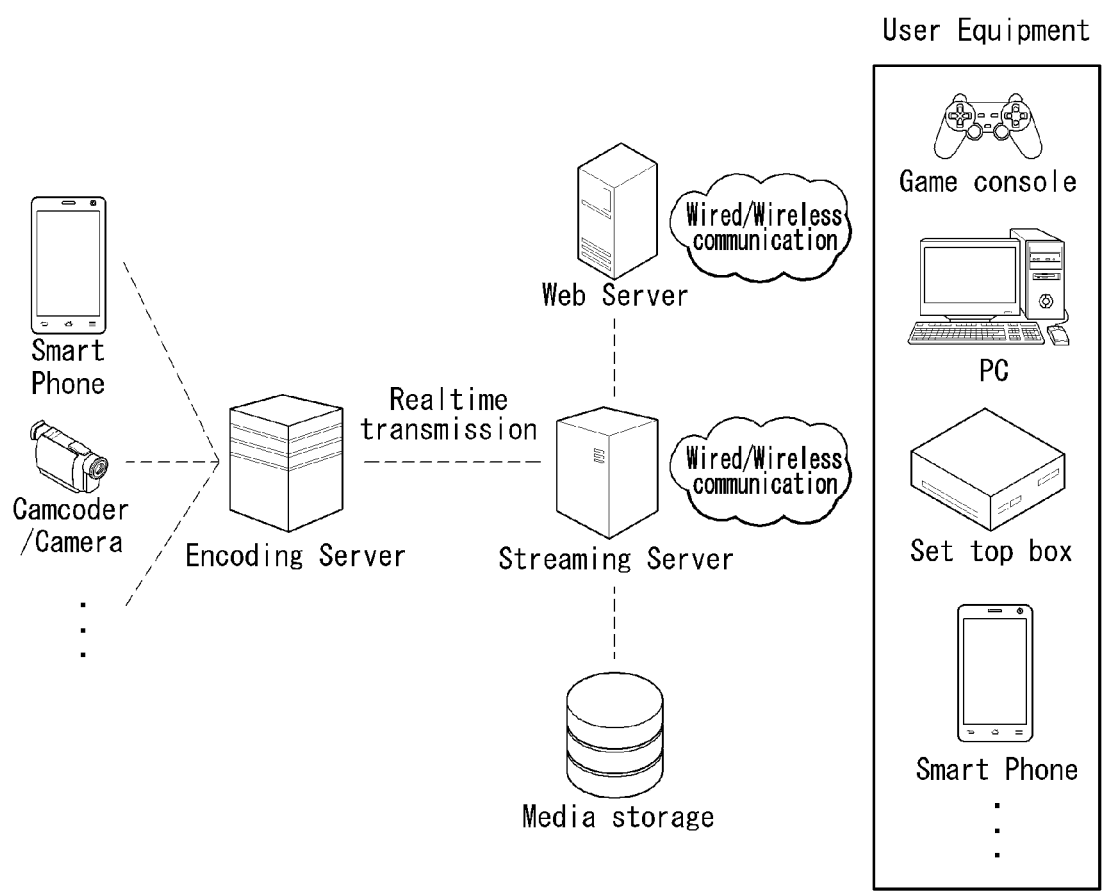

INTRA PREDICTION MODE BASED IMAGE PROCESSING METHOD, AND APPARATUS THEREFOR

CROSS-REFERENCE TO RELATED APPLICATIONS

This application is the National Stage filing under 35 U.S.C. 371 of International Application No. PCT/KR2018/006927, filed on Jun. 19, 2018, which claims the benefit of U.S. Provisional Applications No. 62/521,556, filed on Jun. 19, 2017, the contents of which are all hereby incorporated by reference herein in their entirety.

TECHNICAL FIELD

The disclosure relates to a still image or moving image processing method and, more particularly, to a method of encoding/decoding a still image or moving image based on an intra prediction mode and an apparatus supporting the same.

BACKGROUND ART

A compression encoding means a series of signal processing techniques for transmitting digitized information through a communication line or techniques for storing the information in a form that is proper for a storage medium. The media including a picture, an image, an audio, and the like may be the target for the compression encoding, and particularly, the technique of performing the compression encoding targeted to the picture is referred to as a video image compression.

The next generation video contents are supposed to have the characteristics of high spatial resolution, high frame rate and high dimensionality of scene representation. In order to process such contents, drastic increase of memory storage, memory access rate and processing power will be resulted.

Accordingly, it is required to design the coding tool for processing the next generation video contents efficiently.

DISCLOSURE

Technical Problem

Recently, unlike the existing intra prediction method (or intra prediction method) using only one reference sample, various weight-based intra prediction methods of generating a prediction sample using two or more reference samples are being discussed.

Although such a weight-based intra prediction method is applied, if reference sample filtering for an intra prediction is performed, the accuracy of prediction may be reduced because excessive smoothing is performed.

Accordingly, in order to solve the problem, an object of the disclosure proposes a method of adaptively determining whether to apply reference sample filtering in performing a weight-based intra prediction.

The objects of the disclosure are not limited to the technical objects described above, and other technical that are objects not mentioned herein may be understood to those skilled in the art from the description below.

Technical Solution

In an aspect of the disclosure, a method of processing an image based on an intra prediction mode may include identifying whether a weighted intra prediction is permitted in a current block and whether the weighted intra prediction is applied to the current block, identifying whether reference sample filtering is applied to the current block if the weighted intra prediction is not permitted in the current block or the weighted intra prediction is not applied to the current block, and performing reference sample filtering on reference samples neighboring the current block when the reference sample filtering is applied.

Preferably, a syntax element indicating whether the weighted intra prediction is permitted may be signaled in a sequence, picture or slice unit.

Preferably, the reference sample filtering may not be performed on the current block when the weighted intra prediction is permitted in the current block and the weighted intra prediction is applied to the current block.

Preferably, identifying whether the reference sample filtering is applied to the current block may include identifying whether an intra prediction mode of the current block is not a DC mode and a prediction direction of the intra prediction mode of the current block belongs to a predetermined specific range.

Preferably, performing the reference sample filtering may include determining a filter used for the reference sample filtering by comparing a difference value between reference samples at specific locations neighboring the current block with a predetermined threshold.

Preferably, identifying whether the reference sample filtering is applied to the current block may include identifying a reference sample adaptive filtering flag.

Preferably, the weighted intra prediction may be a position-dependent intra prediction combination.

Preferably, identifying whether the reference sample filtering is applied to the current block may include identifying whether the reference sample filtering is applied to the current block based on at least one of the size of the current block, the number of transform coefficients not 0 within a residual block of the current block, the size of the residual block of the current block or whether a non-separable secondary transform is applied to the current block.

In another aspect of the disclosure, an apparatus for processing a video based on an intra prediction mode may include a weighted intra prediction identification unit configured to identify whether a weighted intra prediction is permitted in a current block and whether the weighted intra prediction is applied to the current block, a reference sample filtering identification unit configured to identify whether reference sample filtering is applied to the current block if the weighted intra prediction is not permitted in the current block or the weighted intra prediction is not applied to the current block, and a reference sample filtering unit configured to perform reference sample filtering on reference samples neighboring the current block when the reference sample filtering is applied.

Advantageous Effects

According to an embodiment of the disclosure, compression performance can be enhanced and complexity can be reduced through optimization between a weight-based intra prediction method and a reference sample filtering method.

The technical effects of the disclosure are not limited to the technical effects described above, and other technical effects not mentioned herein may be understood to those skilled in the art from the description below.

DESCRIPTION OF DRAWINGS

The accompanying drawings, which are included herein as a part of the description for help understanding the disclosure, provide embodiments of the disclosure, and describe the technical features of the disclosure with the description below.

FIG. 1 is an embodiment to which the disclosure is applied, and shows a schematic block diagram of an encoder in which the encoding of a still image or moving image signal is performed.

FIG. 2 is an embodiment to which the disclosure is applied, and shows a schematic block diagram of a decoder in which the encoding of a still image or moving image signal is performed.

FIG. 3 is a diagram for illustrating the split structure of a coding unit to which the disclosure may be applied.

FIG. 4 is a diagram for illustrating a prediction unit to which the disclosure may be applied.

FIG. 5 is an embodiment to which the disclosure is applied and is a diagram illustrating an intra prediction method.

FIG. 6 illustrates prediction directions according to intra prediction modes.

FIG. 7 is an embodiment to which the disclosure may be applied and is a diagram for describing a position-dependent intra prediction combination method.

FIG. 8 is an embodiment to which the disclosure may be applied and is a flowchart for describing a reference sample adaptive filtering method.

FIG. 9 is an embodiment to which the disclosure may be applied and is a flowchart illustrating a method of filtering a reference sample if the existing intra prediction method is applied.

FIG. 10 is an embodiment to which the disclosure may be applied and is a flowchart illustrating a method of filtering a reference sample in an image compression technology in which a weighted intra prediction method is used.

FIG. 11 is an embodiment to which the disclosure may be applied and is a flowchart illustrating a method of filtering a reference sample in an image compression technology in which RSAF is used.

FIG. 12 is an embodiment to which the disclosure may be applied and is a flowchart illustrating a method of filtering a reference sample in an image compression technology in which a weighted intra prediction method is used.

FIG. 13 is an embodiment to which the disclosure may be applied and is a flowchart illustrating a method of filtering a reference sample in an image compression technology in which a weighted intra prediction method is used.

FIG. 14 is an embodiment to which the disclosure may be applied and is a flowchart illustrating a method of adaptively filtering a reference sample in an image compression technology in which a weighted intra prediction method is used.

FIG. 15 is an embodiment to which the disclosure may be applied and is a flowchart illustrating a method of adaptively filtering a reference sample in an image compression technology in which a weighted intra prediction method is used.

FIG. 16 is an embodiment to which the disclosure may be applied and is a flowchart illustrating a method of adaptively filtering a reference sample in an image compression technology in which a weighted intra prediction method is used.

FIG. 17 is an embodiment to which the disclosure may be applied and is a flowchart illustrating a method of adaptively filtering a reference sample in an image compression technology in which a weighted intra prediction method is used.

FIG. 18 is an embodiment to which the disclosure may be applied and is a flowchart illustrating a method of filtering a reference sample in an image compression technology in which a weighted intra prediction method is used.

FIG. 19 is a flowchart illustrating a reference sample filtering method of determining whether to apply reference sample filtering based on whether to permit a PDPC according to an embodiment of the disclosure.

FIG. 20 is a flowchart illustrating a reference sample filtering method of determining whether to apply reference sample filtering based on whether to permit a PDPC according to an embodiment of the disclosure.

FIG. 21 is a flowchart illustrating a reference sample filtering method of determining whether to apply reference sample filtering based on whether to permit a PDPC according to an embodiment of the disclosure.

FIGS. 22 to 24 are flowcharts illustrating a reference sample filtering method of determining whether to apply filtering based on several conditions according to an embodiment of the disclosure.

FIGS. 25 to 27 are flowcharts illustrating a reference sample filtering method of determining whether to apply filtering based on several conditions according to an embodiment of the disclosure.

FIGS. 28 to 30 are flowcharts illustrating a reference sample filtering method of determining whether to apply filtering based on several conditions according to an embodiment of the disclosure.

FIGS. 31 to 33 are flowcharts illustrating a reference sample filtering method of determining whether to apply filtering based on several conditions according to an embodiment of the disclosure.

FIG. 34 is a diagram illustrating an intra prediction mode-based linear interpolation prediction method according to an embodiment of the disclosure.

FIG. 35 is a diagram more specifically illustrating an intra prediction unit according to an embodiment of the disclosure.

FIG. 36 is an embodiment to which the disclosure is applied and illustrates the structure of a content streaming system.

MODE FOR INVENTION

Hereinafter, preferred embodiments of the disclosure will be described by reference to the accompanying drawings. The description that will be described below with the accompanying drawings is to describe exemplary embodiments of the disclosure, and is not intended to describe the only embodiment in which the disclosure may be implemented. The description below includes particular details in order to provide perfect understanding of the disclosure. However, it is understood that the disclosure may be embodied without the particular details to those skilled in the art.

In some cases, in order to prevent the technical concept of the disclosure from being unclear, structures or devices which are publicly known may be omitted, or may be depicted as a block diagram centering on the core functions of the structures or the devices.

Further, although general terms widely used currently are selected as the terms in the disclosure as much as possible, a term that is arbitrarily selected by the applicant is used in a specific case. Since the meaning of the term will be clearly described in the corresponding part of the description in such a case, it is understood that the disclosure will not be simply interpreted by the terms only used in the description of the disclosure, but the meaning of the terms should be figured out.

Specific terminologies used in the description below may be provided to help the understanding of the disclosure. Furthermore, the specific terminology may be modified into other forms within the scope of the technical concept of the disclosure. For example, a signal, data, a sample, a picture, a frame, a block, etc may be properly replaced and interpreted in each coding process.

Hereinafter, in this disclosure, a "processing unit" means a unit by which an encoding/decoding processing process, such as prediction, transform and/or quantization, is performed. Hereinafter, for convenience of description, a processing unit may also be called a "processing block" or "block."

A processing unit may be construed as a meaning including a unit for a luma component and a unit for a chroma component. For example, a processing unit may correspond to a coding tree unit (CTU), a coding unit (CU), a prediction unit (PU) or a transform unit (TU).

Furthermore, a processing unit may be construed as a unit for a luma component or a unit for a chroma component. For example, a processing unit may correspond to a coding tree block (CTB), coding block (CB), prediction block (PB) or transform block (TB) for a luma component. Alternatively, a processing unit may correspond to a coding tree block (CTB), coding block (CB), prediction block (PB) or transform block (TB) for a chroma component. Furthermore, the disclosure is not limited thereto, and a processing unit may be construed as a meaning including a unit for a luma component and a unit for a chroma component.

Furthermore, a processing unit is not essentially limited to a block of a square, but may have a polygon form having three or more vertexes.

Furthermore, hereinafter, in this disclosure, a pixel or pixel element is collected referred to as a sample. Furthermore, using a sample may mean using a pixel value or a pixel element value.

FIG. 1 is an embodiment to which the disclosure is applied, and shows a schematic block diagram of an encoder in which the encoding of a still image or moving image signal is performed.

Referring to FIG. 1, an encoder 100 may include a picture split unit 110, a subtraction unit 115, a transform unit 120, a quantization unit 130, a dequantization unit 140, an inverse transform unit 150, a filtering unit 160, a decoded picture buffer (DPB) 170, a prediction unit 180 and an entropy encoding unit 190. Furthermore, the prediction unit 180 may include an inter prediction unit 181 and an intra prediction unit 182.

The video split unit 110 splits an input video signal (or picture or frame), input to the encoder 100, into one or more processing units.

The subtractor 115 generates a residual signal (or residual block) by subtracting a prediction signal (or prediction block), output by the prediction unit 180 (i.e., inter prediction unit 181 or intra prediction unit 182), from the input video signal. The generated residual signal (or residual block) is transmitted to the transform unit 120.

The transform unit 120 generates transform coefficients by applying a transform scheme (e.g., discrete cosine transform (DCT), discrete sine transform (DST), graph-based transform (GBT) or Karhunen-Loeve transform (KLT)) to the residual signal (or residual block). In this case, the transform unit 120 may generate the transform coefficients by performing transform using a determined transform scheme depending on a prediction mode applied to the residual block and the size of the residual block.

The quantization unit 130 quantizes the transform coefficient and transmits it to the entropy encoding unit 190, and the entropy encoding unit 190 performs an entropy coding operation of the quantized signal and outputs it as a bit stream.

Meanwhile, the quantized signal that is outputted from the quantization unit 130 may be used for generating a prediction signal. For example, by applying dequantization and inverse transformation to the quantized signal through the dequantization unit 140 and the inverse transform unit 150, the residual signal may be reconstructed. By adding the reconstructed residual signal to the prediction signal that is outputted from the inter prediction unit 181 or the intra prediction unit 182, a reconstructed signal may be generated.

Meanwhile, during such a compression process, adjacent blocks are quantized by different quantization parameters from each other, and accordingly, an artifact in which block boundaries are shown may occur. Such a phenomenon is referred to blocking artifact, which is one of the important factors for evaluating image quality. In order to decrease such an artifact, a filtering process may be performed. Through such a filtering process, the blocking artifact is removed and the error for the current picture is decreased at the same time, thereby the image quality being improved.

The filtering unit 160 applies filtering to the reconstructed signal, and outputs it through a play-back device or transmits it to the decoded picture buffer 170. The filtered signal transmitted to the decoded picture buffer 170 may be used as a reference picture in the inter prediction unit 181. As such, by using the filtered picture as a reference picture in an inter picture prediction mode, the encoding rate as well as the image quality may be improved.

The decoded picture buffer 170 may store the filtered picture in order to use it as a reference picture in the inter prediction unit 181.

The inter prediction unit 181 performs a temporal prediction and/or a spatial prediction by referencing the reconstructed picture in order to remove a temporal redundancy and/or a spatial redundancy. In this case, since the reference picture used for performing a prediction is a transformed signal that goes through the quantization or the dequantization by a unit of block when being encoded/decoded previously, there may exist blocking artifact or ringing artifact.

Accordingly, in order to solve the performance degradation owing to the discontinuity of such a signal or the quantization, by applying a low pass filter to the inter prediction unit 181, the signals between pixels may be interpolated by a unit of sub-pixel. Herein, the sub-pixel means a virtual pixel that is generated by applying an interpolation filter, and an integer pixel means an actual pixel that is existed in the reconstructed picture. As a method of interpolation, a linear interpolation, a bi-linear interpolation, a wiener filter, and the like may be applied.

The interpolation filter may be applied to the reconstructed picture, and may improve the accuracy of prediction. For example, the inter prediction unit 181 may perform prediction by generating an interpolation pixel by applying the interpolation filter to the integer pixel, and by using the interpolated block that includes interpolated pixels as a prediction block.

The intra prediction unit 182 predicts the current block by referring to the samples adjacent the block that is to be encoded currently. The intra prediction unit 182 may perform the following procedure in order to perform the intra prediction. First, the intra prediction unit 182 may prepare a reference sample that is required for generating a prediction signal. Furthermore, the intra prediction unit 182 may generate a prediction signal by using the reference sample prepared. After, the intra prediction unit 182 may encode the prediction mode. In this case, the reference sample may be prepared through reference sample padding and/or reference sample filtering. Since the reference sample goes through the prediction and the reconstruction process, there may be a quantization error. Accordingly, in order to decrease such an error, the reference sample filtering process may be performed for each prediction mode that is used for the intra prediction.

In particular, the intra prediction unit 182 according to the disclosure may perform intra prediction on a current block by linearly interpolating prediction sample values generated based on the intra prediction mode of the current block. The intra prediction unit 182 is described in more detail later.

The prediction signal (or prediction block) generated through the inter prediction unit 181 or the intra prediction unit 182 may be used to generate a reconstructed signal (or reconstructed block) or may be used to generate a residual signal (or residual block).

FIG. 2 is an embodiment to which the disclosure is applied, and shows a schematic block diagram of a decoder in which the encoding of a still image or moving image signal is performed.

Referring to FIG. 2, a decoder 200 may include an entropy decoding unit 210, a dequantization unit 220, an inverse transform unit 230, an addition unit 235, a filtering unit 240, a decoded picture buffer (DPB) 250 and a prediction unit 260. Furthermore, the prediction unit 260 may include an inter prediction unit 261 and an intra prediction unit 262.

Furthermore, the reconstructed video signal outputted through the decoder 200 may be played through a play-back device.

The decoder 200 receives the signal (i.e., bit stream) outputted from the encoder 100 shown in FIG. 1, and the entropy decoding unit 210 performs an entropy decoding operation of the received signal.

The dequantization unit 220 acquires a transform coefficient from the entropy-decoded signal using quantization step size information.

The inverse transform unit 230 obtains a residual signal (or residual block) by inversely transforming transform coefficients using an inverse transform scheme.

The adder 235 adds the obtained residual signal (or residual block) to the prediction signal (or prediction block) output by the prediction unit 260 (i.e., inter prediction unit 261 or intra prediction unit 262), thereby generating a reconstructed signal (or reconstructed block).

The filtering unit 240 applies filtering to the reconstructed signal (or reconstructed block) and outputs it to a playback device or transmits it to the decoding picture buffer unit 250. The filtered signal transmitted to the decoding picture buffer unit 250 may be used as a reference picture in the inter prediction unit 261.

In this disclosure, the embodiments described in the filtering unit 160, the inter prediction unit 181 and the intra prediction unit 182 of the encoder 100 may also be applied to the filtering unit 240, the inter prediction unit 261 and the intra prediction unit 262 of the decoder, respectively, in the same way.

In particular, the intra prediction unit 262 according to the disclosure may perform intra prediction on a current block by linearly interpolating prediction sample values generated based on an intra prediction mode of the current block. The intra prediction unit 262 is described in detail later.

In general, the block-based image compression method is used in a technique (e.g., HEVC) for compressing a still image or a moving image. A block-based image compression method is a method of processing an image by splitting the video into specific block units, and may decrease the capacity of memory and a computational load.

FIG. 3 is a diagram for illustrating the split structure of a coding unit that may be applied to the disclosure.

The encoder splits a single image (or picture) in a coding tree unit (CTU) of a rectangle form, and sequentially encodes a CTU one by one according to raster scan order.

In HEVC, the size of a CTU may be determined to be one of 64×64, 32×32 and 16×16. The encoder may select and use the size of CTU according to the resolution of an input video or the characteristics of an input video. A CTU includes a coding tree block (CTB) for a luma component and a CTB for two chroma components corresponding to the luma component.

One CTU may be split in a quad-tree structure. That is, one CTU may be split into four units, each having a half horizontal size and half vertical size while having a square form, thereby being capable of generating a coding unit (CU). The split of the quad-tree structure may be recursively performed. That is, a CU is hierarchically from one CTU in a quad-tree structure.

A CU means a basic unit for a processing process of an input video, for example, coding in which intra/inter prediction is performed. A CU includes a coding block (CB) for a luma component and a CB for two chroma components corresponding to the luma component. In HEVC, the size of a CU may be determined to be one of 64×64, 32×32, 16×16 and 8×8.

Referring to FIG. 3, a root node of a quad-tree is related to a CTU. The quad-tree is split until a leaf node is reached, and the leaf node corresponds to a CU.

This is described in more detail. A CTU corresponds to a root node and has the deepest depth (i.e., depth=0) value. A CTU may not be split depending on the characteristics of an input video. In this case, the CTU corresponds to a CU.

A CTU may be split in a quad-tree form. As a result, lower nodes of a depth 1 (depth=1) are generated. Furthermore, a node (i.e., a leaf node) no longer split from the lower node having the depth of 1 corresponds to a CU. For example, in FIG. 3(b), a CU(a), CU(b) and CU(j) corresponding to nodes a, b and j have been once split from a CTU, and have a depth of 1.

At least one of the nodes having the depth of 1 may be split in a quad-tree form again. As a result, lower nodes of a depth 2 (i.e., depth=2) are generated. Furthermore, a node (i.e., leaf node) no longer split from the lower node having the depth of 2 corresponds to a CU. For example, in FIG. 3(b), a CU(c), CU(h) and CU(i) corresponding to nodes c, h and i have been twice split from the CTU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from the lower node having the depth of 3 corresponds to a CU. For example, in FIG. 3(b), a CU(d), CU(e), CU(f) and CU(g) corresponding to nodes d, e, f and g have been split from the CTU three times, and have a depth of 3.

In the encoder, a maximum size or minimum size of a CU may be determined according to the characteristics of a video image (e.g., resolution) or by considering encoding rate. Furthermore, information about the size or information capable of deriving the size may be included in a bit stream. A CU having a maximum size is referred to as the largest coding unit (LCU), and a CU having a minimum size is referred to as the smallest coding unit (SCU).

In addition, a CU having a tree structure may be hierarchically split with predetermined maximum depth information (or maximum level information). Furthermore, each split CU may have depth information. Since the depth information represents the split count and/or degree of a CU, the depth information may include information about the size of a CU.

Since the LCU is split in a quad-tree form, the size of the SCU may be obtained using the size of the LCU and maximum depth information. Alternatively, the size of the LCU may be obtained using the size of the SCU and maximum depth information of a tree.

For a single CU, information (e.g., a split CU flag (split_cu_flag)) indicating whether the corresponding CU is split may be forwarded to the decoder. The split information is included in all of CUs except the SCU. For example, when the value of the flag indicating whether to split is '1', the corresponding CU is further split into four CUs, and when the value of the flag that represents whether to split is '0', the corresponding CU is not split any more, and the processing process for the corresponding CU may be performed.

As described above, the CU is a basic unit of the coding in which the intra prediction or the inter prediction is performed. The HEVC splits the CU in a prediction unit (PU) for coding an input video more effectively.

The PU is a basic unit for generating a prediction block, and even in a single CU, the prediction block may be generated in different way by a unit of a PU. However, the intra prediction and the inter prediction are not used together for the PUs that belong to a single CU, and the PUs that belong to a single CU are coded by the same prediction method (i.e., intra prediction or the inter prediction).

The PU is not split in the Quad-tree structure, but is split once in a single CU in a predetermined form. This will be described by reference to the drawing below.

FIG. 4 is a diagram for illustrating a prediction unit that may be applied to the disclosure.

A PU is differently split depending on whether the intra prediction mode is used or the inter prediction mode is used as the coding mode of the CU to which the PU belongs.

FIG. 4(a) illustrates a PU of the case where the intra prediction mode is used, and FIG. 4(b) illustrates a PU of the case where the inter prediction mode is used.

Referring to FIG. 4(a), assuming the case where the size of a single CU is 2N×2N (N=4, 8, 16 and 32), a single CU may be split into two types (i.e., 2N×2N or N×N).

In this case, in the case where a single CU is split into the PU of 2N×2N form, it means that only one PU is existed in a single CU.

In contrast, in the case where a single CU is split into the PU of N×N form, a single CU is split into four PUs, and different prediction blocks are generated for each PU unit. However, such a PU split may be performed only in the case where the size of a CB for the luma component of a CU is a minimum size (i.e., if a CU is the SCU).

Referring to FIG. 4(b), assuming that the size of a single CU is 2N×2N (N=4, 8, 16 and 32), a single CU may be split into eight PU types (i.e., 2N×2N, N×N, 2N×N, N×2N, nL×2N, nR×2N, 2N×nU and 2N×nD)

As in intra prediction, the PU split of N×N form may be performed only in the case where the size of a CB for the luma component of a CU is a minimum size (i.e., if a CU is the SCU).

Inter-prediction supports the PU split of a 2N×N form in the horizontal direction and an N×2N form in the vertical direction.

In addition, the inter prediction supports the PU split in the form of nL×2N, nR×2N, 2N×nU and 2N×nD, which is asymmetric motion split (AMP). In this case, 'n' means ¼ value of 2N. However, the AMP may not be used in the case where a CU to which a PU belongs is a CU of minimum size.

In order to efficiently encode an input video in a single CTU, the optimal split structure of a coding unit (CU), prediction unit (PU) and transform unit (TU) may be determined based on a minimum rate-distortion value through the processing process as follows. For example, as for the optimal CU split process in a 64×64 CTU, the rate-distortion cost may be calculated through the split process from a CU of a 64×64 size to a CU of an 8×8 size. A detailed process is as follows.

1) The optimal split structure of a PU and TU that generates a minimum rate distortion value is determined by performing inter/intra prediction, transformation/quantization, dequantization/inverse transformation and entropy encoding on a CU of a 64×64 size.

2) The optimal split structure of a PU and TU is determined by splitting a 64×64 CU into four CUs of a 32×32 size and generating a minimum rate distortion value for each 32×32 CU.

3) The optimal split structure of a PU and TU is determined by further splitting a 32×32 CU into four CUs of a 16×16 size and generating a minimum rate distortion value for each 16×16 CU.

4) The optimal split structure of a PU and TU is determined by further splitting a 16×16 CU into four CUs of an 8×8 size and generating a minimum rate distortion value for each 8×8 CU.

5) The optimal split structure of a CU in a 16×16 block is determined by comparing the rate-distortion value of the 16×16 CU obtained in the process of 3) with the addition of the rate-distortion value of the four 8×8 CUs obtained in the process of 4). This process is also performed on the remaining three 16×16 CUs in the same manner.

6) The optimal split structure of a CU in a 32×32 block is determined by comparing the rate-distortion value of the 32×32 CU obtained in the process of 2) with the addition of the rate-distortion value of the four 16×16 CUs obtained in the process of 5). This process is also performed on the remaining three 32×32 CUs in the same manner.

7) Lastly, the optimal split structure of a CU in a 64×64 block is determined by comparing the rate-distortion value of the 64×64 CU obtained in the process of 1) with the addition of the rate-distortion value of the four 32×32 CUs obtained in the process of 6).

In an intra prediction mode, a prediction mode is selected in a PU unit, and prediction and reconstruction are performed on the selected prediction mode in an actual TU unit.

A TU means a basic unit by which actual prediction and reconstruction are performed. A TU includes a transform block (TB) for a luma component and two chroma components corresponding to the luma component.

In the example of FIG. 3, as if one CTU is split in a quad-tree structure to generate a CU, a TU is hierarchically split from one CU to be coded in a quad-tree structure.

A TU is split in the quad-tree structure, and a TU split from a CU may be split into smaller lower TUs. In HEVC, the size of a TU may be determined to be any one of 32×32, 16×16, 8×8 and 4×4.

Referring back to FIG. 3, it is assumed that the root node of the quad-tree is related to a CU. The quad-tree is split until a leaf node is reached, and the leaf node corresponds to a TU.

This is described in more detail. A CU corresponds to a root node and has the deepest depth (i.e., depth=0) value. A CU may not be split depending on the characteristics of an input video. In this case, the CU corresponds to a TU.

A CU may be split in a quad-tree form. As a result, lower nodes, that is, a depth 1 (depth=1), are generated. Furthermore, a node (i.e., leaf node) no longer split from the lower node having the depth of 1 corresponds to a TU. For example, in FIG. 3(b), a TU(a), TU(b) and TU(j) corresponding to the nodes a, b and j have been once split from a CU, and have a depth of 1.

At least one of the nodes having the depth of 1 may be split again in a quad-tree form. As a result, lower nodes, that is, a depth 2 (i.e., depth=2), are generated. Furthermore, a node (i.e., leaf node) no longer split from the lower node having the depth of 2 corresponds to a TU. For example, in FIG. 3(b), a TU(c), TU(h) and TU(i) corresponding to the nodes c, h and i have been split twice from the CU, and have a depth of 2.

Furthermore, at least one of the nodes having the depth of 2 may be split in a quad-tree form again. As a result, lower nodes having a depth of 3 (i.e., depth=3) are generated. Furthermore, a node (i.e., leaf node) no longer split from a lower node having the depth of 3 corresponds to a CU. For example, in FIG. 3(b), a TU(d), TU(e), TU(f), TU(g) corresponding to the nodes d, e, f and g have been split from the CU three times, and have the depth of 3.

A TU having a tree structure may be hierarchically split based on predetermined highest depth information (or highest level information). Furthermore, each split TU may have depth information. The depth information may also include information about the size of the TU because it indicates the number of times and/or degree that the TU has been split.

With respect to one TU, information (e.g., a split TU flag (split_transform_flag)) indicating whether a corresponding TU has been split may be transferred to the decoder. The split information is included in all TUs other than a TU of the least size. For example, if the value of the flag indicating whether a TU has been split is '1', the corresponding TU is split into four TUs. If the value of the flag '0', the corresponding TU is no longer split.

Prediction

In order to reconstruct a current processing unit on which decoding is performed, the decoded part of a current picture including the current processing unit or other pictures may be used.

A picture (slice) using only a current picture for reconstruction, that is, performing only intra prediction, may be referred to as an intra picture or I picture (slice). A picture (slice) using the greatest one motion vector and reference index in order to predict each unit may be referred to as a predictive picture or P picture (slice). A picture (slice) using a maximum of two motion vectors and reference indices in order to predict each unit may be referred to as a bi-predictive picture or B picture (slice).

Intra-prediction means a prediction method of deriving a current processing block from a data element (e.g., sample value, etc.) of the same decoded picture (or slice). That is, intra prediction means a method of predicting a pixel value of the current processing block with reference to reconstructed regions within a current picture.

Inter-prediction means a prediction method of deriving a current processing block based on a data element (e.g., sample value or motion vector) of a picture other than a current picture. That is, inter prediction means a method of predicting the pixel value of the current processing block with reference to reconstructed regions within another reconstructed picture other than a current picture.

Hereinafter, intra prediction is described in more detail.

Intra-Prediction

FIG. 5 is an embodiment to which the disclosure is applied and is a diagram illustrating an intra prediction method.

Referring to FIG. 5, the decoder derives an intra prediction mode of a current processing block (S501).

In intra prediction, there may be a prediction direction for the location of a reference sample used for prediction depending on a prediction mode. An intra prediction mode having a prediction direction is referred to as intra angular prediction mode "Intra_Angular prediction mode." In contrast, an intra prediction mode not having a prediction direction includes an intra planar (INTRA_PLANAR) prediction mode and an intra DC (INTRA_DC) prediction mode.

Table 1 illustrates intra prediction modes and associated names, and FIG. 6 illustrates prediction directions according to intra prediction modes.

TABLE 1

| Intra prediction mode | Associated names |
| --- | --- |
| 0 | INTRA_PLANAR |
| 1 | INTRA_DC |
| 2 . . . 34 | INTRA_ANGULAR2 . . . INTRA_ANGULAR34 |

In intra prediction, prediction may be on a current processing block based on a derived prediction mode. A reference sample used for prediction and a detailed prediction method are different depending on a prediction mode. Accordingly, if a current block is encoded in an intra prediction mode, the decoder derives the prediction mode of a current block in order to perform prediction.

The decoder checks whether neighboring samples of the current processing block may be used for prediction and configures reference samples to be used for prediction (S502).

In intra prediction, neighboring samples of a current processing block mean a sample neighboring the left boundary of the current processing block of an nS×nS size, a total of 2×nS samples neighboring the left bottom of the current processing block, a sample neighboring the top boundary of the current processing block, a total of 2×nS samples neighboring the top right of the current processing block, and one sample neighboring the top left of the current processing block.

However, some of the neighboring samples of the current processing block have not yet been decoded or may not be available. In this case, the decoder may configure reference samples to be used for prediction by substituting unavailable samples with available samples.

The decoder may perform the filtering of the reference samples based on the intra prediction mode (S503).

Whether the filtering of the reference samples will be performed may be determined based on the size of the current processing block. Furthermore, a method of filtering the reference samples may be determined by a filtering flag transferred by the encoder.

The decoder generates a prediction block for the current processing block based on the intra prediction mode and the reference samples (S504). That is, the decoder generates the prediction block for the current processing block (i.e., generates a prediction sample) based on the intra prediction mode derived in the intra prediction mode derivation step S501 and the reference samples obtained through the reference sample configuration step S502 and the reference sample filtering step S503.

If the current processing block has been encoded in the INTRA_DC mode, in order to minimize the discontinuity of the boundary between processing blocks, at step S504, the left boundary sample of the prediction block (i.e., a sample within the prediction block neighboring the left boundary) and the top boundary sample (i.e., a sample within the prediction block neighboring the top boundary) may be filter.

Furthermore, at step S504, in the vertical mode and horizontal mode of the intra angular prediction modes, as in the INTRA_DC mode, filtering may be applied to the left boundary sample or the top boundary sample.

This is described in more detail. If the current processing block has been encoded in the vertical mode or the horizontal mode, the value of a prediction sample may be derived based on a reference sample located in a prediction direction. In this case, a boundary sample that belongs to the left boundary sample or top boundary sample of the prediction block and that is not located in the prediction direction may neighbor a reference sample not used for prediction. That is, the distance from the reference sample not used for prediction may be much closer than the distance from the reference sample used for prediction.

Accordingly, the decoder may adaptively apply filtering on left boundary samples or top boundary samples depending on whether an intra prediction direction is a vertical direction or a horizontal direction. That is, the decoder may apply filtering on the left boundary samples if the intra prediction direction is the vertical direction, and may apply filtering on the top boundary samples if the intra prediction direction is the horizontal direction.

Position-Dependent Intra Prediction Combination (PDPC)

FIG. 7 is an embodiment to which the disclosure may be applied and is a diagram for describing a position-dependent intra prediction combination method.

In an embodiment of the disclosure, a position-dependent intra prediction combination (hereinafter referred to as a "PDPC") indicates a method of generating the final prediction sample using an unfiltered reference sample and a filtered reference sample.

Referring to FIG. 7, r indicates an unfiltered reference sample sequence, and s indicates a filtered reference sample sequence. For example, the final prediction sample generated using an unfiltered reference sample and a filtered reference sample may be calculated using Equation 1.

$$p[x,y]=\{(c_1^{(v)}>>\lfloor y/d \rfloor)r[x,-1]-(c_2^{(v)}>>\lfloor y/d \rfloor)r[-1,-1]+(c_1^{()}>>\lfloor x/d \rfloor)r[--1,y]-(c_2^{()}>>\lfloor x/d \rfloor)r[-1,-1]+b[x,y]q[x,y]+64\}>>7$$ [Equation 1]

In this case, $c_1^v$, $c_2^v$, $c_1$, $c_2$ indicate prediction parameters (or weight parameters) applied to an unfiltered reference sample, and may be previously stored in the encoder/decoder. Furthermore, the prediction parameter may be pre-defined for each prediction direction and/or each block size. Furthermore, a d value may be a value preset based on a block size. Furthermore, b[x,y] indicates a normalization factor, and may be calculated using Equation 2, for example.

$$b[x,y]=128-(c_1^{(v)}>>\lfloor y/d \rfloor)+(c_2^{(v)}>>\lfloor y/d \rfloor)-(c_1^{(v)}>>\lfloor y/d \rfloor)+(c_2^{()}>>\lfloor y/d \rfloor)$$ [Equation 2]

Furthermore, a reference sample may be filtered by applying various and several filters (e.g., a low bandpass filter). For example, a reference sample used for a PDPC may be filtered using Equation 3.

$$s=ar+(1-a)(h_k*r)$$ [Equation 3]

In this case, "a" indicates a prediction parameter (or weight parameter), and "k" indicates a filter index. The prediction parameter and the filter index k may be defined for each prediction direction and each block size.

Reference Sample Adaptive Filtering (RSAF)

FIG. 8 is an embodiment to which the disclosure may be applied and is a flowchart for describing a reference sample adaptive filtering method.

In an embodiment of the disclosure, a reference sample adaptive filtering (hereinafter referred to as "RSAF") method indicates a method of filtering a reference sample using a specific filter adaptively determined based on several conditions among a plurality of filters.

In one embodiment, as illustrated in FIG. 8, in the RSAF, whether to apply reference sample filtering may be determined using prediction mode information and flag information, and a filter used for reference sample filtering among a plurality of filters may be determined. In this case, the following two low bandpass filters may be used.

3-tap low bandpass filter: [1, 2, 1]/4
5-tap low bandpass filter: [2, 3, 6, 3, 2]/16

Embodiment 1

In one embodiment of the disclosure, the encoder/decoder can optimize an interaction between an intra prediction method and a reference sample filtering method. In particular, in the present embodiment, the encoder/decoder may perform filtering on a reference sample using a uniform method regardless of whether an actual normal intra prediction (i.e., the existing intra prediction) is applied or a weight-based intra prediction is applied in the condition in which a weight-based intra prediction can be used.

In the disclosure, the weight-based intra prediction indicates a method of generating a prediction sample using reference samples to which a weight has been applied. The weight-based intra prediction may also be referred to as a weighted-based intra prediction, a weighted intra prediction, a weighted intra prediction or the like. The weight-based intra prediction may be any one of a PDPC, a linear interpolation intra prediction (LIP) or a bi-linear interpolation intra prediction, for example. Furthermore, an intra prediction not the weighted intra prediction may be referred to as a normal intra prediction (or normal intra frame prediction). For example, the normal intra prediction may be an intra prediction method using one reference sample (or interpolated reference sample) determined based on a prediction direction using an intra prediction method which is used in the existing image compression technology.

FIG. 9 is an embodiment to which the disclosure may be applied and is a flowchart illustrating a method of filtering a reference sample if the existing intra prediction method is applied.

Referring to FIG. 9, the encoder/decoder identifies whether a prediction mode of a current block is a DC mode or whether a prediction direction of the current block deviates from a range to which filtering is applied (S901).

The encoder/decoder identifies whether a strong filter is available and whether the current block satisfies a strong filter application condition (S902). Whether the strong filter is available may be signaled from the encoder to the decoder through a higher level syntax. For example, a syntax element indicating whether the strong filter is available may be signaled from the encoder to the decoder in a sequence, picture or slice unit.

In one embodiment, if a difference between the sample values of a top left sample and a top right sample among reference samples of a current block is greater than a predetermined first threshold or a difference between the sample values of a top left sample and a bottom left sample among the reference samples of the current block is greater than a predetermined second threshold or the size of the current block is greater than a predetermined third threshold, the strong filter application condition may be satisfied.

If the strong filter is available and the current block satisfies the strong filter application condition, the encoder/decoder filters a reference sample of the current block using the strong filter (S903). If the strong filter is not available or the current block does not satisfy the strong filter application condition, the encoder/decoder filters the reference sample of the current block using a weak filter (S904). Prediction performance can be enhanced and subjective picture quality can also be improved by smoothing a reference sample using a strong filter or a weak filter.

FIG. 10 is an embodiment to which the disclosure may be applied and is a flowchart illustrating a method of filtering a reference sample in an image compression technology in which a weighted intra prediction method is used.

Referring to FIG. 10, the encoder/decoder identifies whether a weighted intra prediction is allowed using an intra prediction method of a current block (S1001). Whether the weighted intra prediction is allowed may be signaled from the encoder to the decoder through a higher level syntax. For example, a syntax element indicating whether a strong filter is available may be signaled from the encoder to the decoder in a sequence, picture or slice unit. If the weighted intra prediction is allowed in the current block, reference sample filtering may not be performed on the current block.

In contrast, if the weighted intra prediction is not allowed in the current block, reference sample filtering may be performed on the current block. Steps S1002, S1003, S1004, and S1005 may be performed identically with steps S901, S902, S903, and S904 described in FIG. 9, respectively.

That is, FIG. 10 is an embodiment illustrating a method of adaptively applying reference sample filtering in a compression technology in which a weighted intra prediction and a normal intra prediction can be used together based on the method described in FIG. 9. According to the present embodiment, in the condition in which a weighted intra prediction can be used, reference sample filtering is not performed regardless of whether the weighted intra prediction is actually applied to a current block. In such a method, prediction performance may be degraded if a normal intra prediction not a weighted intra prediction is applied to a current block, but overall compression performance can be improved by raising the probability that a weighted intra prediction is selected.

In the disclosure, filtering for a reference sample may be performed using various and several methods. In one embodiment, RSAF in which reference sample filtering is performed based on a 5-tap filter may be applied through flag signaling. This is described with reference to the following figure.

FIG. 11 is an embodiment to which the disclosure may be applied and is a flowchart illustrating a method of filtering a reference sample in an image compression technology in which RSAF is used.

Referring to FIG. 11, the encoder/decoder identifies whether a prediction mode of a current block is a DC mode (S1101).

The encoder/decoder identifies whether an RSAF flag is not 1 or whether a weak filter application condition is satisfied (S1102). The RSAF flag may be signaled from the encoder to the decoder in a unit of a sequence, picture, slice, CTU or coding unit.

In one embodiment, if a difference between the sample values of a top left sample and a top right sample among reference samples of the current block is smaller than a predetermined first threshold or a difference between the sample values of a top left sample and a bottom left sample among the reference samples of the current block is smaller than a predetermined second threshold or the size of the current block is smaller than a predetermined third threshold, the weak filter application condition may be satisfied.

When the RSAF flag is not 1 or if the current block satisfies the weak filter application condition, the encoder/decoder filters a reference sample of the current block using a weak filter (S1103). In this case, the weak filter may be a 3-tap filter having [1,2,1] coefficients. When the RSAF flag is 1 and if the current block does not satisfy the weak filter application condition, the encoder/decoder filters a reference sample of the current block using a 5-tap filter (S1104). In this case, the 5-tap filter may be the filter illustrated in FIG. 8.

As described above, in the condition RSAF not the existing reference sampling is adaptively selected, a weighted intra prediction in addition to a normal intra prediction are performed at the same time. As in the following figure, reference sample filtering may be adaptively applied.

FIG. 12 is an embodiment to which the disclosure may be applied and is a flowchart illustrating a method of filtering a reference sample in an image compression technology in which a weighted intra prediction method is used.

Referring to FIG. 12, the encoder/decoder identifies whether a weighted intra prediction is allowed as an intra prediction method of a current block (S1201). Whether the weighted intra prediction is allowed may be signaled from the encoder to the decoder through a higher level syntax. For example, a syntax element indicating whether a strong filter is available may be signaled from the encoder to the decoder in a sequence, picture or slice unit. If the weighted intra prediction is allowed in the current block, reference sample filtering may not be performed on the current block.

In contrast, if the weighted intra prediction is not allowed in the current block, filtering may be adaptively performed on a neighbor reference sample of the current block. Specifically, if the weighted intra prediction is not allowed in the current block, the encoder/decoder identifies whether a prediction mode of the current block is a DC mode (S1202). If the prediction mode of the current block is not a DC mode, the encoder/decoder identifies an RSAF flag (S1203). The RSAF flag may be signaled from the encoder to the decoder in a unit of a sequence, picture, slice, CTU or coding unit. If the prediction mode of the current block is a DC mode, reference sample filtering may not be performed on the current block.

The encoder/decoder determines a 5-tap filter as a filter for reference sample filtering when the RSAF flag is 1, and determines the weak filter as a filter for reference sample filtering when the RSAF flag is 0 (S1204, S1205). The weak filter may be a 3-tap filter having [1,2,1] coefficients, and the 5-tap filter may be the filter illustrated in FIG. 8. Thereafter, the encoder/decoder may filter reference samples of the current block using the determined filter.

Furthermore, in one embodiment of the disclosure, if all RSAF, a weighted intra prediction and a normal intra prediction are used, there is proposed a method of adaptively selecting a strong filter.

FIG. 13 is an embodiment to which the disclosure may be applied and is a flowchart illustrating a method of filtering a reference sample in an image compression technology in which a weighted intra prediction method is used.

Referring to FIG. 13, the encoder/decoder identifies whether a weighted intra prediction is allowed as an intra prediction method of a current block (S1301). Whether the weighted intra prediction is allowed may be signaled from the encoder to the decoder through a higher level syntax. For example, a syntax element indicating whether a strong filter is available may be signaled from the encoder to the decoder in a sequence, picture or slice unit. If the weighted intra prediction is allowed in the current block, reference sample filtering may not be performed on the current block.

In contrast, if the weighted intra prediction is not allowed in the current block, filtering may be adaptively performed on neighbor reference samples of the current block. Specifically, if the weighted intra prediction is not allowed in the current block, the encoder/decoder identifies whether a prediction mode of the current block is a DC mode (S1302). If the prediction mode of the current block is not a DC mode, the encoder/decoder identifies an RSAF flag (S1303). The RSAF flag may be signaled from the encoder to the decoder in a unit of a sequence, picture, slice, CTU or coding unit. When the RSAF flag is 1, the encoder/decoder determines a 5-tap filter as a filter for reference sample filtering (S1304). If the prediction mode of the current block is a DC mode, reference sample filtering may not be performed on the current block.

When the RSAF flag is not 1, the encoder/decoder determines whether a strong filter is available and whether the current block satisfies a strong filter application condition (S1305). Whether the strong filter is available may be signaled from the encoder to the decoder through a higher level syntax. For example, a syntax element indicating whether a strong filter is available may be signaled from the encoder to the decoder in a sequence, picture or slice unit.

In one embodiment, if a difference between the sample values of the top left sample and the top right sample among reference samples of the current block is greater than a predetermined first threshold or a difference in the sample value between a top left sample and a bottom left sample among the reference samples of the current block is greater than a predetermined second threshold or the size of the current block is greater than a predetermined third threshold, the strong filter application condition may be satisfied.

If the strong filter is not available or the current block does not satisfy the strong filter application condition, the encoder/decoder determines the weak filter as a filter for reference sample filtering (S1306). If the strong filter is available and the current block satisfies the strong filter application condition, the encoder/decoder determines the strong filter as a filter for reference sample filtering (S1307). Thereafter, the encoder/decoder may filter reference samples of the current block using the determined filter.

According to an embodiment of the disclosure, if coding is performed in an intra prediction mode in a block having the condition in which a weighted intra prediction cannot be applied, a reference sample can be more adaptively filtered, and thus compression performance can be improved.

Embodiment 2

In one embodiment of the disclosure, the encoder/decoder can optimize an interaction (or processing operation) between an intra prediction method and a reference sample filtering method. In particular, the present embodiment proposes a method of adaptively filtering, by the encoder/decoder, a reference sample based on whether a weighted intra prediction is actually applied to a current processing block in the condition in which the weighted intra prediction can be used.

In FIGS. 10, 12, 13 of Embodiment 1, if the condition in which the weighted intra prediction can be used is satisfied, although a prediction mode of a current processing block does not actually correspond to a weighted intra prediction mode, reference sample filtering is not performed. This has an advantage in that overall compression performance can be improved as experimentally proved, but may be accompanied by subjective picture quality degradation. In order to solve such a problem, there is proposed a method of adaptively performing reference sample filtering depending on whether a weighted intra prediction is actually applied.

FIG. 14 is an embodiment to which the disclosure may be applied and is a flowchart illustrating a method of adaptively filtering a reference sample in an image compression technology in which a weighted intra prediction method is used.

Referring to FIG. 14, the encoder/decoder identifies whether a weighted intra prediction is allowed as an intra prediction method of a current block and whether the weighted intra prediction is applied to a current block (S1401). Whether the weighted intra prediction is allowed may be signaled from the encoder to the decoder through a higher level syntax. For example, a syntax element indicating whether a strong filter is available may be signaled from the encoder to the decoder in a sequence, picture or slice unit. Furthermore, whether the weighted intra prediction is applied to the current block (or whether a prediction mode of the current block is a weighted intra prediction mode) may be signaled from the encoder to the decoder in a coding tree block, coding block, prediction block or transform block unit.

If the weighted intra prediction is allowed in the current block and the weighted intra prediction is applied to the current block, reference sample filtering may not be performed on the current block.

In contrast, if the weighted intra prediction is not allowed in the current block or if the weighted intra prediction is not applied to the current block, reference sample filtering may be performed on the current block. If the weighted intra prediction is not allowed in the current block or if the weighted intra prediction is not applied to the current block, steps S1402, S1403, S1404, and S1405 may be performed identically with steps S1001, S1002, S1003, and S1004 described in FIG. 10.

The reference sample filtering method described in FIG. 10 has an advantage in that it has relatively higher compression performance compared to the present embodiment, but has a disadvantage in that subjective picture quality degradation occurs in the case of a block compressed as a normal intra prediction not a weighted intra prediction. In contrast, according to the present embodiment, subjective picture quality degradation can be improved by adaptively applying reference sample filtering on a block to which a weighted intra prediction is not actually applied.

FIG. 15 is an embodiment to which the disclosure may be applied and is a flowchart illustrating a method of adaptively filtering a reference sample in an image compression technology in which a weighted intra prediction method is used.

Referring to FIG. 15, the encoder/decoder identifies whether a weighted intra prediction is allowed as an intra prediction method of a current block and whether the weighted intra prediction is applied to the current block (S1501). Whether the weighted intra prediction is allowed may be signaled from the encoder to the decoder through a higher level syntax. For example, a syntax element indicating whether a strong filter is available may be signaled from the encoder to the decoder in a sequence, picture or slice unit. Furthermore, whether the weighted intra prediction is applied to the current block (or whether a prediction mode of the current block is a weighted intra prediction mode) may be signaled from the encoder to the decoder in a coding tree block, coding block, prediction block or transform block unit.

If the weighted intra prediction is allowed in the current block and the weighted intra prediction is applied to the current block, reference sample filtering may not be performed on the current block.

In contrast, if the weighted intra prediction is not allowed in the current block or if the weighted intra prediction is not applied to the current block, reference sample filtering may be performed on the current block. Specifically, the encoder/decoder identifies whether an intra prediction mode of the current block is a DC mode (S1502). If the current block is the DC mode, the encoder/decoder does not perform reference sample filtering on the current block. If the current block is not the DC mode, the encoder/decoder filters a reference sample of the current block using a weak filter (S1503).

FIG. 16 is an embodiment to which the disclosure may be applied and is a flowchart illustrating a method of adaptively filtering a reference sample in an image compression technology in which a weighted intra prediction method is used.

Referring to FIG. 16, steps S1601 and S1602 may be applied identically with steps S1501 and S1502, respectively, and a description thereof is omitted.

If the current block is in the DC mode, the encoder/decoder does not perform reference sample filtering on the current block. If the current block is not in the DC mode, the encoder/decoder filters a reference sample of the current block using a strong filter (S1603).

In the embodiment of FIG. 15 or 16, if a normal intra prediction not the weighted intra prediction is applied, the encoder/decoder may filter the reference sample using only one of a weak filter or a strong filter if the current block does not correspond to a DC mode. According to an embodiment of the disclosure, an improvement effect of compression performance can be always maintained, and subjective picture quality can be improved.

FIG. 17 is an embodiment to which the disclosure may be applied and is a flowchart illustrating a method of adaptively filtering a reference sample in an image compression technology in which a weighted intra prediction method is used.

Referring to FIG. 17, the encoder/decoder identifies whether a weighted intra prediction is allowed as an intra prediction method of a current block and whether the weighted intra prediction is applied to the current block (S1701). If the weighted intra prediction is allowed in the current block and the weighted intra prediction is applied to the current block, reference sample filtering may not be performed on the current block.

In contrast, if the weighted intra prediction is not allowed in the current block or if the weighted intra prediction is not applied to the current block, a reference sample of the current block may be adaptively filtered. Specifically, if the weighted intra prediction is not allowed in the current block or if the weighted intra prediction is not applied to the current block, the encoder/decoder identifies whether a prediction mode of the current block is a DC mode (S1702). If the prediction mode of the current block is not the DC mode, the encoder/decoder identifies an RSAF flag (S1703). The RSAF flag may be signaled from the encoder to the decoder in a unit of a sequence, picture, slice, CTU or coding unit. If the prediction mode of the current block is the DC mode, reference sample filtering may not be performed on the current block.

The encoder/decoder determines a 5-tap filter as a filter for reference sample filtering when the RSAF flag is 1, and determines the weak filter as a filter for reference sample filtering when the RSAF flag is 0 (S1704, S1705). The weak filter may be a 3-tap filter having [1,2,1] coefficients, and the 5-tap filter may be the filter illustrated in FIG. 8. Thereafter, the encoder/decoder may filter reference samples of the current block using the determined filter. According to the present embodiment, effects in that subjective picture quality can be improved, and compression performance can be secured can be achieved.

FIG. 18 is an embodiment to which the disclosure may be applied and is a flowchart illustrating a method of filtering a reference sample in an image compression technology in which a weighted intra prediction method is used.

Referring to FIG. 18, the encoder/decoder identifies whether a weighted intra prediction is allowed as an intra prediction method of a current block and whether the weighted intra prediction is applied to the current block (S1801). If the weighted intra prediction is allowed in the current block and if the weighted intra prediction is applied to the current block, reference sample filtering may not be performed on the current block.

In contrast, if the weighted intra prediction is not allowed in the current block or if the weighted intra prediction is not applied to the current block, a reference sample of the current block may be adaptively filtered. Specifically, if the weighted intra prediction is not allowed in the current block or if the weighted intra prediction is not applied to the current block, the encoder/decoder identifies whether a prediction mode of the current block is a DC mode (S1802). If the prediction mode of the current block is the DC mode, reference sample filtering may not be performed on the current block. If the prediction mode of the current block is not the DC mode, the encoder/decoder identifies an RSAF flag (S1803). The RSAF flag may be signaled from the encoder to the decoder in a unit of a sequence, picture, slice, CTU or coding unit. The encoder/decoder determines a 5-tap filter as a filter for reference sample filtering when the RSAF flag is 1 (S1804).

When the RSAF flag is not 1, the encoder/decoder identifies whether a strong filter is available and whether the current block satisfies a strong filter application condition (S1805). Whether the strong filter is available may be signaled from the encoder to the decoder through a higher level syntax. For example, a syntax element indicating whether a strong filter is available may be signaled from the encoder to the decoder in a sequence, picture or slice unit.

If the strong filter is not available or the current block does not satisfy the strong filter application condition, the encoder/decoder determines the weak filter as a filter for reference sample filtering (S1806). If the strong filter is available and the current block satisfies the strong filter application condition, the encoder/decoder determines the strong filter as a filter for reference sample filtering (S1807). Thereafter, the encoder/decoder may filter reference samples of the current block using the determined filter. According to the present embodiment, prediction performance can be improved by identically applying the existing reference sample filtering a block having an RSAF flag of 0.

Embodiment 3

In one embodiment of the disclosure, the encoder/decoder may determine whether to apply reference sample filtering by also considering a condition related to a transform in adaptively applying the reference sample filtering in a compression technology in which a weighted intra prediction and a normal intra prediction are used.

In Embodiment 1 and Embodiment 2, the encoder/decoder may identify whether a weighted intra prediction is allowed in a current block or whether the weighted intra prediction is applied, and may determine whether to apply reference sample filtering. Meanwhile, the probability that a weighted-based intra prediction will be actually applied in a specific condition may be low. Accordingly, in one embodiment of the disclosure, there is proposed a method of determining whether to apply reference sample filtering with reference to a condition related to a transform by considering the low probability. That is, the encoder/decoder may determine whether to apply reference sample filtering based on the size of a block, whether to apply a transform, or the characteristics of a residual signal.

In one embodiment, the condition of "whether to permit a weighted intra prediction" or "whether to permit a weighted intra prediction and whether to apply a weighted intra prediction" at steps S1001-S1801 of FIGS. 10 to 18 may be set like Equation 4.

Bool Weig $t$ IP is Allowed=blockSize>MIN_BLOCKSIZE_WIP&&blockSize<MAX_BLOCKSIZE_WIP   [Equation 4]

That is, the encoder/decoder may determine whether to apply reference sample filtering based on the block size of a current block like Equation 4. The distance between a prediction sample and a reference sample may be excessively close or distant in a block that deviates from a specific size range. If the distance between a prediction sample and a reference sample is excessively close, it may be more efficient to not apply a weighted intra prediction because prediction performance is high. Furthermore, if the distance between a prediction sample and a reference sample is excessively distant, to apply a weighted intra prediction may be inappropriate because a correlation between the reference sample and the prediction sample is low. Accordingly, the encoder/decoder may apply a weighted intra prediction to only a block belonging to a specific size range in order to solve such problems and reduce signaling overhead.

Furthermore, in one embodiment, the encoder/decoder may determine whether to apply reference sample filtering by considering the characteristics of a residual signal. For example, the encoder/decoder may determine whether to apply reference sample filtering using Equation 5 or Equation 6 as a condition.

Bool Weig $t$ IP is Allowed=nonZeroCoeff>MIN_NUM_OC_COEFF&&nonZeroCoeff<MAX_NUM_OF_COEFF   [Equation 5]

Bool Weig $t$ IP is Allowed=Intensity(Coeff.of Block)<THRESHOLD_INTENSITY_OF_COEFF   [Equation 6]

Referring to Equation 5, the encoder/decoder may apply reference sample filtering if the number of coefficients not 0 in a residual signal of a current block belongs to a specific range. If the number of coefficients not 0 is a specific number or less, prediction performance may be better even in the case of a normal intra prediction not a weighted intra prediction. In such a case, signaling overhead can be reduced by limiting the number of residual signals.

Furthermore, referring to Equation 6, if the size of a residual signal is smaller than a specific size, prediction performance may be better in the case of a normal intra prediction block. Accordingly, the encoder/decoder can reduce signaling overhead and improve compression performance by considering the size of a residual signal.

Furthermore, in one embodiment, the encoder/decoder may determine whether to apply reference sample filtering based on whether to apply a secondary transform. In this case, like Equation 7 below, the encoder/decoder may consider whether Oil a non-separable secondary transform (NSST) is applied to a current block as a condition. The NSST indicates a method of performing a secondary transform on a transform coefficient primarily transformed by index-signaling a kernel optimized based on an intra prediction mode.

Bool Weig $t$ IP is Allowed=(NSST index==0)   [Equation 7]

The NSST may also be used for a weighted intra prediction in addition to a normal intra prediction. However, the NSST has greater complexity compared to compression performance. In one embodiment, the encoder/decoder may configure the NSST so that it is used for only a normal intra prediction. That is, the encoder/decoder may configure the NSST so that a weighted intra prediction is not used when an NSST index is 1 (i.e., if the NSST is used).

In one embodiment, the condition of Equation 7 may not be set if both an NSST and a weighted intra prediction can be applied together. In contrast, compression performance may be degraded in addition to the degradation of subjective picture quality due to a complexity problem between a weighted intra prediction and reference sample filtering and a problem in that reference sample filtering is not applied in all intra prediction modes if a condition, such as Equation 7, is not present. Accordingly, the condition of Equation 7 is also used if an NSST and a weighted intra prediction can be applied together.

Embodiment 4

In one embodiment of the disclosure, the encoder/decoder may determine whether to apply reference sample filtering by considering a condition related to a transform in adaptively applying the reference sample filtering in a compression technology in which a weighted intra prediction and a normal intra prediction are used. Specifically, the encoder/decoder may perform reference sample filtering, described in Embodiment 1 or Embodiment 2, using the method proposed in Embodiment 3 as a condition. In the present embodiment, effects of optimal compression performance and a complexity reduction can be obtained and subjective picture quality improvements can also be accompanied through coordination between several conditions and a filtering method.

The weighted intra prediction may include the following two types as an example. The first may be a weighted intra prediction method that replaces the existing intra prediction. The second may be a weighted intra prediction method newly added to the existing intra prediction modes. In this case, the weighted intra prediction method that replaces the existing intra prediction may be an unequal weight planar (UWP) mode or an unequal weight 66 (UW66) mode, for example. In this case, the UWP mode indicates a weighted intra planar mode that replaces the existing planar mode. Furthermore, the UW66 mode indicates a weighted intra prediction mode that replaces a No. 66 mode in a compression technology using 67 intra prediction modes. Hereinafter, in this disclosure, the UWP mode or the UW66 mode may be generally called an unequal weight (UW) prediction method (or prediction mode).

Furthermore, the weighted intra prediction method newly added to the existing intra prediction modes may be a PDPC method, for example. The weighted intra prediction method used as the condition of Embodiment 1 or Embodiment 2 indicates a prediction method having a competitive relation with a normal intra prediction method.

FIG. 19 is a flowchart illustrating a reference sample filtering method of determining whether to apply reference sample filtering based on whether to permit a PDPC according to an embodiment of the disclosure.

Referring to FIG. 19, the encoder/decoder identifies whether a PDPC is allowed as an intra prediction method of a current block (S1901). If whether the PDPC is allowed in the current block, reference sample filtering may not be performed on the current block.

In contrast, if the PDPC is not allowed in the current block, a reference sample of the current block may be adaptively filtered. Specifically, if the PDPC is not allowed in the current block, the encoder/decoder identifies whether a prediction mode of the current block is a DC mode or whether the prediction direction of the current block deviates from a range to which filtering is applied (S1902). If the prediction mode of the current block is not the DC mode and the prediction direction of the current block does not deviate from the range to which filtering is applied, the encoder/decoder identifies whether an RSAF is used and an RSAF flag (S1903). The RSAF flag may be signaled from the encoder to the decoder in a unit of a sequence, picture, slice, CTU or coding unit. If the prediction mode of the current block is the DC mode, reference sample filtering may not be performed on the current block.

The encoder/decoder determines a 5-tap filter as a filter for reference sample filtering if the RSAF is used and when the RSAF flag is 1, and determines a weak filter as a filter for reference sample filtering if the RSAF is not used or when the RSAF flag is 0 (S1904, S1905). The weak filter may be a 3-tap filter having [1,2,1] coefficients, and the 5-tap filter may be the filter illustrated in FIG. 8. Thereafter, the encoder/decoder may filter reference samples of the current block using the determined filter.

FIG. 19 illustrates an embodiment in which a reference sample is filtered by considering a case where both a PDPC and RSAF can be used together. In the condition in which a PDPC can be used, the encoder/decoder may not perform reference sample filtering although the PDPC is not applied to a current block.

FIG. 20 is a flowchart illustrating a reference sample filtering method of determining whether to apply reference sample filtering based on whether to permit a PDPC according to an embodiment of the disclosure.

Referring to FIG. 20, the encoder/decoder identifies whether a PDPC is allowed as an intra prediction method of a current block (S2001). If the PDPC is allowed in the current block, reference sample filtering may not be performed on the current block. In contrast, if the PDPC is not allowed in the current block, a reference sample of the current block may be adaptively filtered. Specifically, if the PDPC is not allowed in the current block, the encoder/decoder identifies whether a prediction mode of the current block is a DC mode or whether the prediction direction of the current block deviates from a range to which filtering is applied (S2002).

If the prediction mode of the current block is not the DC mode and the prediction direction of the current block does not deviate from the range to which filtering is applied, the encoder/decoder identifies whether a strong filter is available and whether the current block satisfies a strong filter application condition (S2003). Whether the strong filter is available may be signaled from the encoder to the decoder through a higher level syntax. For example, a syntax element indicating whether a strong filter is available may be signaled from the encoder to the decoder in a sequence, picture or slice unit.

If the strong filter is available and the current block satisfies the strong filter application condition, the encoder/decoder determines the strong filter as a filter for reference sample filtering (S2004). If the strong filter is not available or the current block does not satisfy the strong filter application condition, the encoder/decoder determines a weak filter as a filter for reference sample filtering (S2005). Thereafter, the encoder/decoder may filter reference samples of the current block using the determined filter.

FIG. 20 illustrates an embodiment in which a reference sample is filtered in a compression technology in which a PDPC is used and RSAF is not used. The encoder/decoder may apply the existing reference sample filtering because RSAF is not used.

FIG. 21 is a flowchart illustrating a reference sample filtering method of determining whether to apply reference sample filtering based on whether to permit a PDPC according to an embodiment of the disclosure.

Referring to FIG. 21, the encoder/decoder identifies whether a PDPC is allowed as an intra prediction method of a current block (S2101). If the PDPC is allowed in the current block, reference sample filtering may not be performed on the current block. In contrast, if the PDPC is not allowed in the current block, a reference sample of the current block may be adaptively filtered. Specifically, if the PDPC is not allowed in the current block, the encoder/decoder identifies whether a prediction mode of the current block is a DC mode or whether a prediction direction of the current block deviates from a range to which filtering is applied (S2102).

If the current block is not the DC mode and the prediction direction of the current block does not deviate from the range to which filtering is applied, the encoder/decoder filters a reference sample of the current block using a weak filter (S2103).

In the present embodiment, the encoder/decoder may filter the reference sample using only a weak filter. According to the present embodiment, the probability that a PDPC is selected can be increased by lowering performance of a normal intra prediction, and thus overall compression performance can be improved.

In FIGS. 19 to 21, furthermore, the condition described in Embodiment 3 may be applied to a reference sample filtering determination process as the condition in which a PDPC may be applied (or allowed). This is described with reference to the following figure.

The conditions illustrated in Embodiment 3 may be individually applied, and one or more of the conditions may be partially combined and applied. Hereinafter, a case where possible conditions are combined and applied is described as a prerequisite, but the disclosure is not limited thereto. As described above, the possible conditions may be applied by omitting some conditions and may be individually applied.

FIGS. 22 to 24 are flowcharts illustrating a reference sample filtering method of determining whether to apply filtering based on several conditions according to an embodiment of the disclosure.

Referring to FIGS. 22 to 24, the encoder/decoder identifies whether the size of a current block belongs to a specific range (S2201, S2301, S2401). That is, the encoder/decoder identifies the size of the current block is greater than a predetermined minimum size and smaller than a predetermined maximum size. If, as a result of the identification, the size of the current block belongs to the specific range, the encoder/decoder may not apply reference sample filtering.

The encoder/decoder identifies whether the number of transform coefficients not 0 belongs to a specific range (S2202, S2302, S2402). That is, the encoder/decoder identifies whether the number of transform coefficients not 0 is greater than a predetermined minimum number and smaller than a predetermined maximum number. If, as a result of the identification, the number of transform coefficients not 0 belongs to the specific range, the encoder/decoder may not apply reference sample filtering.

The encoder/decoder identifies whether the size of a residual signal is smaller than a specific threshold (S2203, S2303, S2403). If, as a result of the identification, the size of the residual signal is smaller than the specific threshold, the encoder/decoder may not apply reference sample filtering.

The encoder/decoder identifies whether a PDPC is used only when an NSST index is 0 and whether the NSST index is 0 (S2204, S2304, S2404). If, as a result of the identification, the NSST index is 0, the encoder/decoder may not apply reference sample filtering.

If, as a result of the identification in the above steps, filtering is adaptively performed on a reference sample, steps S2205 to S2208 of FIG. 22 may be performed identically with steps S1902 to S1905 of FIG. 19, and steps S2205 to S2308 of FIG. 23 may be performed identically with steps S2002 to S2005 of FIG. 20, and steps S2405 and S2406 of FIG. 24 may be performed identically with steps S2102 and S2103 of FIG. 21.

FIGS. 22 to 24 illustrate embodiments in which reference sample filtering is performed because the condition in which a PDPC is used is not satisfied if an NSST index is not 0, when a PDPC is used only when the NSST index is 0 using a relation between the PDPC and the NSST. In contrast, in the following embodiment, there is proposed a method of not performing reference sample filtering only when an NSST index is 0 even in a compression technology in which a PDPC is used regardless of the NSST index. This is for preventing the degradation of overall compression performance by performing reference sample filtering although an NSST index is 0.

FIGS. 25 to 27 are flowcharts illustrating a reference sample filtering method of determining whether to apply filtering based on several conditions according to an embodiment of the disclosure.

Referring to FIGS. 25 to 27, the encoder/decoder identifies whether the size of a current block belongs to a specific range (S2501, S2601, S2701). That is, the encoder/decoder identifies whether the size of the current block is greater than a predetermined minimum size and smaller than a predetermined maximum size. If, as a result of the identification, the size of a current block belongs to the specific range, the encoder/decoder may not apply reference sample filtering.

The encoder/decoder identifies whether the number of transform coefficients not 0 belongs to a specific range (S2502, S2602, S2702). That is, the encoder/decoder identifies whether the number of transform coefficients not 0 is greater than a predetermined minimum number and smaller than a predetermined maximum number. If, as a result of the identification, the number of transform coefficients not 0 belongs to the specific range, the encoder/decoder may not apply reference sample filtering.

The encoder/decoder identifies whether the size of a residual signal is smaller than a specific threshold (S2503, S2603, S2703). If, as a result of the identification, the size of the residual signal is smaller than the specific threshold, the encoder/decoder may not apply reference sample filtering.

The encoder/decoder identifies whether an NSST index is 0 (S2504, S2604, S2704). If, as a result of the identification, the NSST index is 0, the encoder/decoder may not apply reference sample filtering.

If, as a result of the identification in the above steps, filtering is adaptively performed on a reference sample, steps S2505 to S2508 of FIG. 25 may be performed identically with steps S1902 to S1905 of FIG. 19, steps S2605 to S2608 of FIG. 26 may be performed identically with steps S2002 to S2005 of FIG. 20, and steps S2705 and S2706 of FIG. 27 may be performed identically with steps S2102 and S2103 of FIG. 21.

Furthermore, hereinafter, there is proposed a method of improving subjective picture quality by performing reference sample filtering in a block to which a PDPC is not actually applied although the PDPC is allowed.

FIGS. 28 to 30 are flowcharts illustrating a reference sample filtering method of determining whether to apply filtering based on several conditions according to an embodiment of the disclosure.

Referring to FIGS. 28 to 30, the encoder/decoder identifies whether the size of a current block belongs to a specific range (S2801, S2901, S3001). That is, the encoder/decoder identifies the size of the current block is greater than a predetermined minimum size and smaller than a predetermined maximum size. If, as a result of the identification, the size of the current block belongs to the specific range, the encoder/decoder may not apply reference sample filtering.

The encoder/decoder identifies whether the number of transform coefficients not 0 belongs to a specific range (S2802, S2902, S3002). That is, the encoder/decoder identifies whether the number of transform coefficients not 0 is greater than a predetermined minimum number and smaller than a predetermined maximum number. If, as a result of the identification, the number of transform coefficients not 0 belongs to the specific range, the encoder/decoder may not apply reference sample filtering.

The encoder/decoder identifies whether the size of a residual signal is smaller than a specific threshold (S2803, S2903, S3003). If, as a result of the identification, the size of the residual signal is smaller than the specific threshold, the encoder/decoder may not apply reference sample filtering.

The encoder/decoder identifies whether an NSST index is 0 (S2804, S2904, S3004). If, as a result of the identification, the NSST index is 0, the encoder/decoder may not apply reference sample filtering.

The encoder/decoder identifies whether a PDPC flag is 1 (S2805, S2905, S3005). If, as a result of the identification, the PDPC flag is 1, the encoder/decoder may not apply reference sample filtering.

If, as a result of the identification in the above steps, filtering is adaptively performed on a reference sample, steps S2806 to S2809 of FIG. 28 may be performed identically with steps S1902 to S1905 of FIG. 19, steps S2906 to S2609 of FIG. 29 may be performed identically with steps S2002 to S2005 of FIG. 20, and steps S3006 and S3007 of FIG. 30 may be performed identically with steps S2102 and S2103 of FIG. 21.

The aforementioned method may be applied to a compression technology to which the UW technology is added as in the following figures.

FIGS. 31 to 33 are flowcharts illustrating a reference sample filtering method of determining whether to apply filtering based on several conditions according to an embodiment of the disclosure.

Referring to FIGS. 31 to 33, steps overlapping steps of FIGS. 28 to 30 may be performed using the same method, and a description thereof is omitted.

Referring to FIG. 31, if a prediction mode of a current block is not a DC mode and a prediction direction of the prediction mode does not currently deviate from a filtering range, the encoder/decoder identifies whether the prediction mode of the current block is an UWP or UW66 mode (S3107). If, as a result of the identification, the prediction mode of the current block is not the UWP or UW66 mode, the encoder/decoder determines a filter used for reference sample filtering, of the current block, through an RSAF flag.

Referring to FIG. 32, if the prediction mode of the current block is not the DC mode and the prediction direction of the prediction mode does not currently deviate from the filtering range, the encoder/decoder identifies whether the prediction mode of the current block is an UWP or UW66 mode (S3207). If, as a result of the identification, the prediction mode of the current block is not the UWP or UW66 mode, the encoder/decoder determines a filter used for reference sample filtering, of the current block.

Referring to FIG. 33, if the prediction mode of the current block is not the DC mode and the prediction direction of the prediction mode does not currently deviate from the filtering range, the encoder/decoder identifies whether the prediction mode of the current block is an UWP or UW66 mode (S3307). If, as a result of the identification, the prediction mode of the current block is not the UWP or UW66 mode, the encoder/decoder filters a reference sample of the current block using a weak filter.

The aforementioned embodiments may be independently and individually performed, and one or more of them may be combined and performed.

FIG. 34 is a diagram illustrating an intra prediction mode-based linear interpolation prediction method according to an embodiment of the disclosure.

The encoder/decoder identifies whether a weighted intra prediction is allowed in a current block and whether the weighted intra prediction is applied to the current block (S3401). As described above, a syntax element indicating whether the weighted intra prediction is allowed may be signaled in a sequence, picture or slice unit. Furthermore, the weighted intra prediction may be a position-dependent intra prediction combination.

If the weighted intra prediction is not allowed in the current block or the weighted intra prediction is not applied to the current block, the encoder/decoder identifies whether reference sample filtering is applied to the current block (S3402).

As described above, the encoder/decoder may identify whether an intra prediction mode of the current block is not a DC mode and a prediction direction of the intra prediction mode of the current block belongs to a predetermined specific range.

Furthermore, as described in Embodiments 3 and 4, the encoder/decoder may identify whether reference sample filtering is applied to the current block based on at least one of the size of the current block, the number of transform coefficients not 0 within a residual block of the current block, the size of the residual block of the current block or whether a non-separable secondary transform is applied to the current block.

If the reference sample filtering is applied, the encoder/decoder performs reference sample filtering on reference samples neighboring the current block (S3403).

As described above, if the weighted intra prediction is allowed in the current block and the weighted intra prediction is applied to the current block, reference sample filtering may not be performed on the current block.

Furthermore, as described above, the encoder/decoder may determine a filter used for reference sample filtering by comparing a difference between reference samples at specific positions neighboring the current block with a predetermined threshold. Furthermore, the encoder/decoder may determine whether to apply RSAF by identifying a reference sample adaptive filtering flag.

FIG. 35 is a diagram more specifically illustrating an intra prediction unit according to an embodiment of the disclosure.

In FIG. 35, the intra prediction unit has been illustrated as a single block, for convenience of description, but the intra prediction unit may be implemented as an element included in the encoder and/or the decoder.

Referring to FIG. 35, the intra prediction unit implements the functions, processes and/or methods proposed in FIGS. 7 to 34. Specifically, the intra prediction unit may include a weighted intra prediction identification unit 3501, a reference sample filtering identification unit 3502, and a reference sample filtering unit 3503.

The weighted intra prediction identification unit 3501 identifies whether a weighted intra prediction is allowed in a current block and whether a weighted intra prediction is applied to the current block. As described above, a syntax element indicating whether the weighted intra prediction is allowed may be signaled in a sequence, picture or slice unit. Furthermore, the weighted intra prediction may be a position-dependent intra prediction combination.

The reference sample filtering identification unit 3502 identifies whether reference sample filtering is applied to a current block if a weighted intra prediction is not allowed in the current block or the weighted intra prediction is not applied to the current block.

As described above, the reference sample filtering identification unit 3502 may identify whether an intra prediction mode of a current block is not a DC mode and a prediction direction of the intra prediction mode of the current block belongs to a predetermined specific range.

Furthermore, as described in Embodiments 3 and 4, the reference sample filtering identification unit 3502 may identify whether reference sample filtering is applied to the current block based on at least one of the size of the current block, the number of transform coefficients not 0 within a residual block of the current block, the size of the residual block of the current block or whether a non-separable secondary transform is applied to the current block.

The reference sample filtering unit 3503 performs reference sample filtering on reference samples neighboring a current block if the reference sample filtering is applied to the current block.

As described above, if a weighted intra prediction is allowed in a current block and the weighted intra prediction is applied to the current block, reference sample filtering may not be performed on the current block.

Furthermore, as described above, the reference sample filtering unit 3503 may determine a filter used for reference sample filtering by comparing a difference between reference samples at specific positions neighboring a current block with a predetermined threshold. Furthermore, the encoder/decoder may determine whether to apply RSAF by identifying a reference sample adaptive filtering flag.

FIG. 36 is an embodiment to which the disclosure is applied and illustrates the structure of a content streaming system.

Referring to FIG. 36, the content streaming system to which the disclosure is applied may basically include an encoding server, a streaming server, a web server, a media storage, a user equipment and a multimedia input device.

The encoding server basically functions to generate a bitstream by compressing content input from multimedia input devices, such as a smartphone, a camera or a camcorder, into digital data, and to transmit the bitstream to the streaming server. For another example, if multimedia input devices, such as a smartphone, a camera or a camcorder, directly generate a bitstream, the encoding server may be omitted.

The bitstream may be generated by an encoding method or bitstream generation method to which the disclosure is applied. The streaming server may temporally store a bitstream in a process of transmitting or receiving the bitstream.

The streaming server transmits multimedia data to the user equipment based on a user request through the web server. The web server plays a role as a medium to notify a user that which service is provided. When a user requests a desired service from the web server, the web server transmits the request to the streaming server. The streaming server transmits multimedia data to the user. In this case, the content streaming system may include a separate control server. In this case, the control server functions to control an instruction/response between the apparatuses within the content streaming system.

The streaming server may receive content from the media storage and/or the encoding server. For example, if content is received from the encoding server, the streaming server may receive the content in real time. In this case, in order to provide smooth streaming service, the streaming server may store a bitstream for a given time.

Examples of the user equipment may include a mobile phone, a smart phone, a laptop computer, a terminal for digital broadcasting, personal digital assistants (PDA), a portable multimedia player (PMP), a navigator, a slate PC, a tablet PC, an ultrabook, a wearable device (e.g., a watch type terminal (smartwatch), a glass type terminal (smart glass), and a head mounted display (HMD)), digital TV, a desktop computer, and a digital signage.

The servers within the content streaming system may operate as distributed servers. In this case, data received from the servers may be distributed and processed.

As described above, the embodiments described in the disclosure may be implemented and performed on a processor, a microprocessor, a controller or a chip. For example, the function units illustrated in the drawings may be implemented and performed on a computer, a processor, a microprocessor, a controller or a chip.

Furthermore, the decoder and the encoder to which the disclosure is applied may be included in a multimedia broadcasting transmission and reception device, a mobile communication terminal, a home cinema video device, a digital cinema video device, a camera for monitoring, a video dialogue device, a real-time communication device such as video communication, a mobile streaming device, a storage medium, a camcorder, a video on-demand (VoD) service provision device, an over the top (OTT) video device, an Internet streaming service provision device, a three-dimensional (3D) video device, a video telephony device, and a medical video device, and may be used to process a video signal or a data signal. For example, the OTT video device may include a game console, a Blueray player, Internet access TV, a home theater system, a smartphone, a tablet PC, and a digital video recorder (DVR).

Furthermore, the processing method to which the disclosure is applied may be produced in the form of a program executed by a computer, and may be stored in a computer-readable recording medium. Multimedia data having a data structure according to the disclosure may also be stored in a computer-readable recording medium. The computer-readable recording medium includes all types of storage devices in which computer-readable data is stored. The computer-readable recording medium may include Blueray disk (BD), a universal serial bus (USB), a ROM, a PROM, an EPROM, an EEPROM, a RAM, a CD-ROM, a magnetic tape, a floppy disk, and an optical data storage device, for example. Furthermore, the computer-readable recording medium includes media implemented in the form of carriers (e.g., transmission through the Internet). Furthermore, a bit stream generated using an encoding method may be stored in a computer-readable recording medium or may be transmitted over wired and wireless communication networks.

Furthermore, an embodiment of the disclosure may be implemented as a computer program product using program code. The program code may be performed by a computer according to an embodiment of the disclosure. The program code may be stored on a carrier readable by a computer.

In the aforementioned embodiments, the elements and characteristics of the disclosure have been combined in a specific form. Each of the elements or characteristics may be considered to be optional unless otherwise described explicitly. Each of the elements or characteristics may be implemented in a form to be not combined with other elements or characteristics. Furthermore, some of the elements and/or the characteristics may be combined to form an embodiment of the disclosure. The sequence of the operations described in the embodiments of the disclosure may be changed. Some of the elements or characteristics of an embodiment may be included in another embodiment or may be replaced with corresponding elements or characteristics of another embodiment. It is evident that an embodiment may be constructed by combining claims not having an explicit citation relation in the claims or may be included as a new claim by amendments after filing an application.

The embodiment according to the disclosure may be implemented by various means, for example, hardware, firmware, software or a combination of them. In the case of an implementation by hardware, the embodiment of the disclosure may be implemented using one or more application-specific integrated circuits (ASICs), digital signal processors (DSPs), digital signal processing devices (DSPDs), programmable logic devices (PLDs), field programmable gate arrays (FPGAs), processors, controllers, microcontrollers, microprocessors, etc.

In the case of an implementation by firmware or software, the embodiment of the disclosure may be implemented in the form of a module, procedure or function for performing the aforementioned functions or operations. Software code may be stored in the memory and driven by the processor. The memory may be located inside or outside the processor and may exchange data with the processor through a variety of known means.

It is evident to those skilled in the art that the disclosure may be materialized in other specific forms without departing from the essential characteristics of the disclosure. Accordingly, the detailed description should not be construed as being limitative, but should be construed as being illustrative from all aspects. The scope of the disclosure should be determined by reasonable analysis of the attached claims, and all changes within the equivalent range of the disclosure are included in the scope of the disclosure.

INDUSTRIAL APPLICABILITY

The aforementioned preferred embodiments of the disclosure have been disclosed for illustrative purposes, and those skilled in the art may improve, change, substitute, or add various other embodiments without departing from the technical spirit and scope of the disclosure disclosed in the attached claims.

The invention claimed is:

1. A method of processing an image based on an intra prediction mode, the method comprising:
  identifying, by a processor, whether a weighted intra prediction is allowed in a current block and whether the weighted intra prediction is applied to the current block;
  identifying, by the processor, whether reference sample filtering is applied to the current block when the weighted intra prediction is not allowed in the current block or the weighted intra prediction is not applied to the current block;
  determining, by the processor, not to perform the reference sample filtering on the current block when the weighted intra prediction is allowed in the current block and the weighted intra prediction is applied to the current block; and
  performing, by the processor, reference sample filtering on reference samples neighboring the current block when the reference sample filtering is applied.

2. The method of claim 1,
  wherein a syntax element indicating whether the weighted intra prediction is allowed is signaled in a sequence, picture or slice unit.

3. The method of claim 1,
  wherein identifying whether the reference sample filtering is applied to the current block comprises identifying whether an intra prediction mode of the current block is not a DC mode and the intra prediction mode of the current block is one of directional modes of a predetermined angular range.

4. The method of claim 3,
  wherein performing the reference sample filtering comprises determining a filter used for the reference sample filtering by comparing a difference value between reference samples at specific locations neighboring the current block with a predetermined threshold.

5. The method of claim 1,
  wherein identifying whether the reference sample filtering is applied to the current block comprises identifying a reference sample adaptive filtering flag.

6. The method of claim 1,
  wherein the weighted intra prediction is a position-dependent intra prediction combination.

7. The method of claim 1,
  wherein identifying whether the reference sample filtering is applied to the current block comprises identifying whether the reference sample filtering is applied to the current block based on at least one of a size of the current block, a number of transform coefficients not 0 within a residual block of the current block, a size of the residual block of the current block or whether a non-separable secondary transform is applied to the current block.

8. An apparatus for processing a video based on an intra prediction mode, the apparatus comprising:
  a processor configured to:
  identify whether a weighted intra prediction is allowed in a current block and whether the weighted intra prediction is applied to the current block;
  identify whether reference sample filtering is applied to the current block when the weighted intra prediction is not allowed in the current block or the weighted intra prediction is not applied to the current block;
  determine not to perform the reference sample filtering on the current block when the weighted intra prediction is allowed in the current block and the weighted intra prediction is applied to the current block; and
  perform reference sample filtering on reference samples neighboring the current block when the reference sample filtering is applied.

* * * * *